United States Patent
Poon et al.

(10) Patent No.: US 8,391,161 B1
(45) Date of Patent: Mar. 5, 2013

(54) VIRTUAL DIAGNOSTIC SYSTEM FOR WIRELESS COMMUNICATIONS NETWORK SYSTEMS

(75) Inventors: Terrence Poon, Fremont, CA (US); Suparna Kumar, Sunnyvale, CA (US); Sunil P. Sheshadri, Sunnyvale, CA (US); Carl Keller, Danville, CA (US); Amit Gupta, Livermore, CA (US)

(73) Assignee: Jasper Wireless, Inc., Mountain View, CA (US)

( * ) Notice: Subject to any disclaimer, the term of this patent is extended or adjusted under 35 U.S.C. 154(b) by 429 days.

(21) Appl. No.: 12/387,962

(22) Filed: May 7, 2009

(51) Int. Cl.
 *G01R 31/08* (2006.01)
(52) U.S. Cl. .................. 370/242; 715/700
(58) Field of Classification Search .......... 715/700; 370/229–240, 241, 242–245, 247, 248
See application file for complete search history.

(56) References Cited

U.S. PATENT DOCUMENTS

| | | | |
|---|---|---|---|
| 7,369,528 B2 * | 5/2008 | Tian | 370/335 |
| 8,036,664 B2 * | 10/2011 | Khetawat et al. | 455/436 |
| 8,264,687 B2 * | 9/2012 | Lundquist et al. | 356/417 |
| 8,295,817 B2 * | 10/2012 | Alfano et al. | 455/414.1 |
| 2003/0086425 A1 * | 5/2003 | Bearden et al. | 370/392 |
| 2004/0113929 A1 * | 6/2004 | Matsuzaki | 345/700 |
| 2007/0245238 A1 * | 10/2007 | Fugitt et al. | 715/700 |
| 2007/0268361 A1 * | 11/2007 | Ren | 348/14.02 |
| 2009/0055736 A1 * | 2/2009 | Yoon | 715/700 |
| 2010/0192062 A1 * | 7/2010 | Anwar | 715/702 |
| 2010/0278056 A1 * | 11/2010 | Meloche et al. | 370/252 |

* cited by examiner

*Primary Examiner* — Ayaz Sheikh
*Assistant Examiner* — Mounir Moutaouakil
(74) *Attorney, Agent, or Firm* — Blakely Sokoloff Taylor & Zafman, LLP

(57) ABSTRACT

A system for monitoring and diagnosing communication systems comprises: an interface, a processor, and a graphical user interface. The interface receives one or more communication data streams. The processor extracts information from the one or more communication data streams. And, the graphical user interface displays the information as a plurality of time-correlated lanes.

23 Claims, 25 Drawing Sheets

| | 500 | 502 | 504 | 506 | 508 |
|---|---|---|---|---|---|
| | Time | Event Type | Device | Network Element | Comments |
| 510 | 12:30PM on JAN 1, 1901 | A | 1 | D | |
| 512 | 12:45PM on JAN 1, 1901 | B | 1 | E | |
| 514 | 12:50PM on JAN 1, 1901 | A | 2 | E | |

FIG. 5B

VIRTUAL DIAGNOSTIC SYSTEM FOR WIRELESS COMMUNICATIONS NETWORK SYSTEMS

BACKGROUND OF THE INVENTION

Cellular networks commonly comprise multiple sub-systems, providing multiple modes of communications functionality. For example, cellular devices utilizing the global system for mobile communications (GSM) voice standard are able to use the general packet radio service (GPRS) layer of the network for data communications, as well as the short message service (SMS) for text communications. The varied systems and modes of communication on a network necessitates tracking many pieces of data aggregated from many different sources particularly when troubleshooting. Because tracing on or through selected network elements, collecting information from multiple disparate sources, normalizing such information, and collating it is necessary to get a meaningful understanding of the sequence of events, troubleshooting a network problem tends to be a very slow and laborious process.

BRIEF DESCRIPTION OF THE DRAWINGS

Various embodiments of the invention are disclosed in the following detailed description and the accompanying drawings.

FIG. 5B is a diagram illustrating an embodiment of a table of communication data stream information.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A network status display system is disclosed. The network status display system comprises a display for correlating many types of historic events for a cellular device on a cellular network along a common timeline. Data is retrieved from a cellular device and from the systems that control the cellular network and is displayed in such a way so as to enable the user to identify problems, unusual behaviors, or inconsistencies. Controls on the network status display system additionally allow communication with the cellular device in order to gain (e.g., probe the system by actively controlling systems) further diagnostic information.

Figure 1:
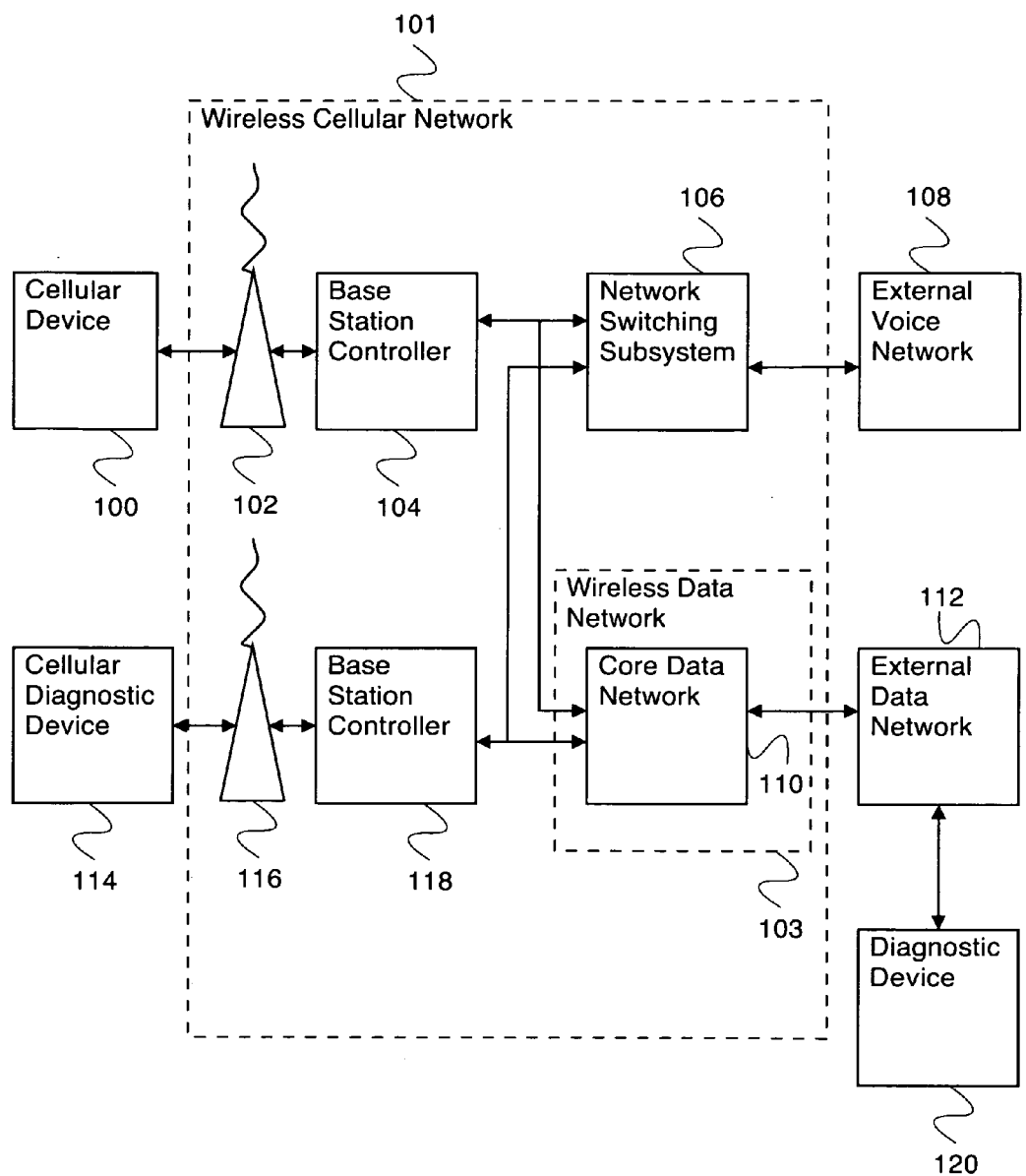
FIG. 1 is a block diagram illustrating an embodiment of a wireless cellular network with data network overlay.

FIG. 1 is a block diagram illustrating an embodiment of a wireless cellular network with data network overlay. In the example shown, cellular device 100 comprises a communications device that uses wireless cellular network 101 and wireless data network 103. In some embodiments, wireless cellular network 101 comprises a global system for mobile communications (GSM) network and wireless data network 103 comprises a general packet radio service (GPRS) network. In some embodiments, cellular network 101 and data network 103 comprise a cellular network and a data network other than a GSM network and a GPRS network. In various embodiments, cellular device 100 comprises a cellular telephone, a mobile smart phone with data transfer capability, a mobile data communications device, a network interface for a wireless data processing device, or any other appropriate mobile communications device. Wireless cellular network 101 allows a user of cellular device 100 to engage in voice communications with devices accessed through external voice network 108 and data communications with devices accessed through external data network 112. Cellular device 100 communicates with wireless cellular network 101 via cellular base station 102. Base station 102 contains a radio transmitter and receiver for communicating with cellular devices (e.g., cellular device 100) and a communications system for communicating with base station controller 104. Base station controller 104 controls base station 102 and enables communication with external voice network 108 via network switching subsystem 106 and with external data network 112 via core data network 110. In various embodiments, base station controller controls one base station, two base stations, ten base stations, or any other appropriate number of base stations.

Network switching subsystem 106 controls voice network switching, maintains a register of cellular device locations, and connects the GSM network with external voice network 108. External voice network 108 is a voice telephony network for connecting various voice telephony devices. In various embodiments, external voice network 108 comprises a public switched telephone network, a private voice telephony network, or any other appropriate voice telephony network. By enabling cellular device 100 to connect to external voice network 108, a user of cellular device 100 is able to have a verbal conversation with another user of a device that is directly or indirectly connected to external voice network 108 (e.g., a cell phone user, a wired telephone user, a internet telephone user—for example, a voice over internet protocol user). For example, a user can use cellular device 100 to make a telephone call to someone. Core data network 110 controls data communications switching and connects cellular network 101 with external data network 112. External data network 112 comprises a data communications network for connection various data communications devices. External data network 112 comprises one or more of the following: a local area network, a wide area network, a wired network, a wireless network, the Internet, a fiber network, a storage area network, or any other appropriate network enabling communication. By enabling cellular device 100 to connect to external data network 112, a user of cellular device 100 or cellular device 100 itself can interact with other devices or servers or applications running on other devices or servers via external data network 112. For example, cellular device 100 can contact a server to inquire about a transaction (e.g., a credit card authorization for a purchase).

Cellular diagnostic device 114 comprises a cellular device configured for diagnostic operations on a wireless network. Cellular diagnostic device 114 communicates with wireless cellular network 101 via base station 116. In some embodiments, base station 116 is the same base station as base station 102. Base station controller 118 controls base station 116 and enables communication with external voice network 108 via network switching subsystem 106 and with external data network 112 via core data network 110. In some embodiments, base station controller 118 is the same base station controller as base station controller 104. Cellular diagnostic device 114 is able to run diagnostic operations on a cellular device (e.g., cellular device 100) communicating with wireless cellular network 101, and to display diagnostic information. In various embodiments, cellular diagnostic device 114 comprises a cellular telephone, a mobile smart phone with data transfer capability, a mobile data communications device, a network interface for a wireless data processing device, or any other appropriate mobile communications device.

Diagnostic device 120 communicates with wireless cellular network 101 via external data network 112 and core data network 110. Diagnostic device 120 is able to run diagnostic operations on a cellular device (e.g., cellular device 100) communicating with wireless cellular network 101, and to display diagnostic information. In various embodiments, diagnostic device 120 comprises a computer, a network enabled data device, a network appliance, or any other appropriate network enabled device.

Figure 2:
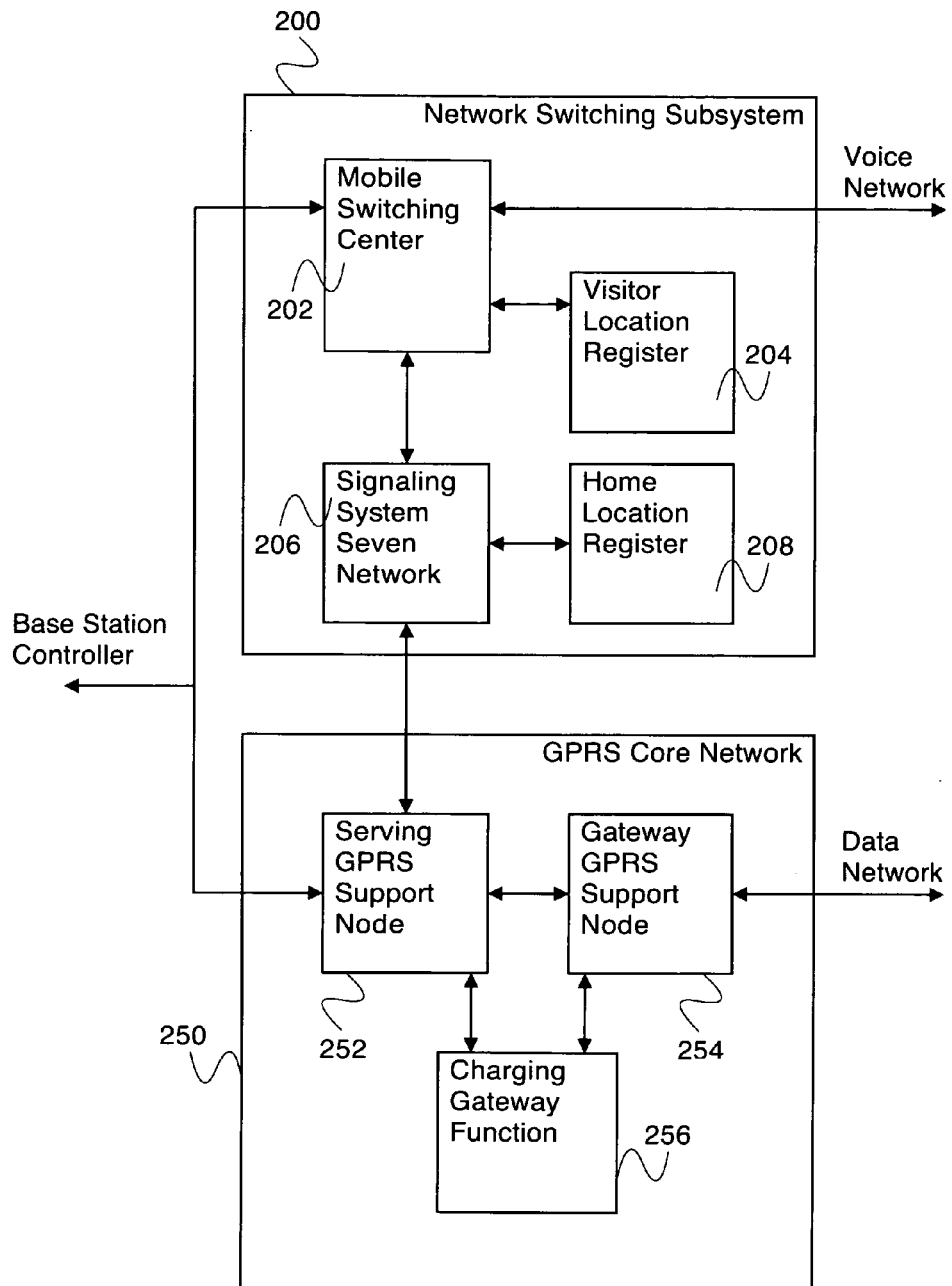
FIG. 2 is a block diagram illustrating an embodiment of a network switching subsystem.

FIG. 2 is a block diagram illustrating an embodiment of a network switching subsystem. In some embodiments, network switching subsystem 200 implements network switching subsystem 106 of FIG. 1. In the example shown, network switching subsystem 200 comprises mobile switching center 202, signaling system seven network 204, visitor location register 206, and home location register 208. Mobile switching center 202 controls (e.g., maintains the connection as a cellular device moves between base stations), sets up (e.g., accesses an external network to create a connection) and releases (e.g., accesses an external network to destroy a connection) a voice connection between a cellular device (e.g., cellular device 100 of FIG. 1) and another voice communication device (e.g., a voice communication device accessed through external voice network 108 of FIG. 1). In some embodiments, mobile switching center 202 additionally tracks the time of the voice connection for the purpose of charging cellular device 100. Visitor location register 204 communicates with mobile switching center 202. In some embodiments, visitor location register 204 is integrated as a part of mobile switching center 202. Visitor location register 204 maintains a list of cellular devices that have roamed into the area served by mobile switching center 202 along with a set of attributes describing each cellular device. In the event that a connection needs to be made to a cellular device while it is roaming in the network served by mobile switching center 202 (e.g., the cellular device receives a phone call) the device attributes (e.g., type of device, current device location, device account type) are retrieved from visitor location register 204 in order to properly make the connection. Home location register 208 maintains a list of cellular devices whose home network is that of network switching system 200. In various embodiments, a cellular device home network comprises the network served by a single base station (e.g., base station 102 of FIG. 1), the network served by a single base station controller (e.g., base station controller 104 of FIG. 1), the network served by a plurality of base station controllers, the entire network of a cellular carrier, or any other appropriate network. When a device leaves its home network, the visitor location register for the network the device has roamed to communicates with the home location register in the home network for the device via signaling system seven network 206. When home location register 208 of the home network of the cellular device has confirmed to visitor location register 204 of the network the device has roamed to that it can allow the device to use its network (e.g., the network associated with home location register 208), the device is added to visitor location register 204, and mobile switching center 202 sets up the communication.

In some embodiments, GPRS core network 250 implements GPRS core network 110 of FIG. 1. In the example shown, GPRS core network 205 comprises serving GPRS support node (SGSN) 252, gateway GPRS support node (GGSN) 254, and charging gateway function 256. SGSN 252 sends data packets to and receives data packets from a cellular device (e.g., cellular device 100 of FIG. 1) and communicates data with GGSN 254. SGSN 252 also retrieves information about roaming devices by contacting home location register 208 of the home network of the roaming device, via signaling system seven network 206. GGSN 254 serves as an interface between GPRS core network 250 and an external data network (e.g., external data network 112 of FIG. 1). GGSN 254 communicates with SGSN 252 and with the external data network, and translates the data packets into the appropriate formats for the devices on each side. In some embodiments, there is more than one GGSN in a given GPRS core network, each GGSN connecting to the same SGSN. In some embodiments, each GGSN connects to the same external data network. In some embodiments, a plurality of GGSNs connect to one or more different data networks. Charging gateway function 256 communicates with SGSN 252 and GGSN 254 and tracks the total amount to charge each cellular device connected to GPRS core network 250. A charging session by a charging gateway function is known as a charging data record (CDR). In some embodiments, a single data session can be charged as a plurality of sequential CDRs.

Figure 3:
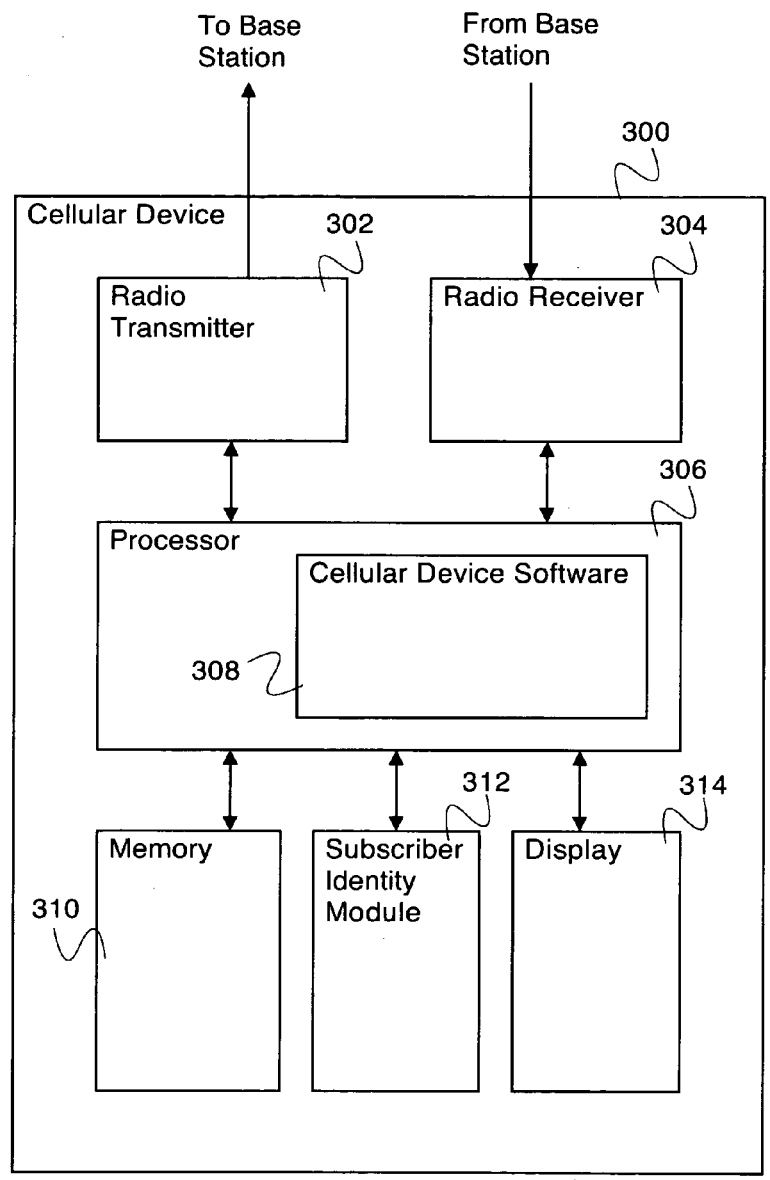
FIG. 3 is a block diagram illustrating an embodiment of a cellular device.

FIG. 3 is a block diagram illustrating an embodiment of a cellular device. In some embodiments, cellular device 300 comprises cellular device 100 of FIG. 1. In the example shown, cellular device 300 comprises radio transmitter 302, radio receiver 304, processor 306, memory 310, subscriber identity module 312, and display 314. Radio transmitter 302 and radio receiver 304 communicate with a base station (e.g., base station 102 of FIG. 1) using wireless radio communication. For example, radio transmitter 302 and radio receiver 304 communicate according to the GSM standard. In various embodiments, radio transmitter 302 and/or radio receiver 304 communicate using frequency modulated signals, phase modulated signals, amplitude modulated signals, time division multiplexing signals, code division multiplexing signals, or signals encoded using any other appropriate communication scheme or protocol. In various embodiments, radio transmitter 302 and/or radio receiver 304 communicate in the medium frequency band, the high frequency band, the very high frequency band, the ultra high frequency band, or any other appropriate frequency band. In various embodiments, radio transmitter 302 and/or radio receiver 304 communicate voice signals, data signals, text signals (e.g., short message service (SMS)), configuration and/or registration signals, or any other appropriate kinds of signals. Radio transmitter 302 and radio receiver 304 receive instructions and communicate data with the rest of cellular device 300 via processor 306. Processor 306 controls cellular device 300. Processor 306 communicates with radio transmitter 302 and radio receiver 304, as well as with memory 310, subscriber identity module 312, and display 314. Processor 306 executes a set of instructions to control the device—for example, instructions in the form of software or code (e.g., designated as cellular device software 308 in FIG. 3). In some embodiments, cellular device software 308 is stored in digital memory (e.g., random access memory, read only memory, programmable read only memory, memory 310, or any other appropriate storage for storing software for processing by a processor). Memory 310 acts as temporary and/or long-term information storage for processor 306 as it is controlling cellular device 300. Subscriber identity module (SIM) 312 comprises a removable module for an identifying number that cellular device 300 uses to identify the user of cellular device 300 to the network. In various embodiments, SIM 312 stores an international subscriber identity module (IMSI) number, an integrated circuit card identifier (ICCID) number, a serial number, or any other appropriate identifying number. Display 314 comprises a display for displaying information to a user. In various embodiments, information comprises device status information, user interface information, diagnostic information, network information, SMS information, or any other appropriate information.

In some embodiments, cellular device 300 comprises a cellular diagnostic device (e.g., cellular diagnostic device 114 of FIG. 1), and cellular device software 308 comprises cellular diagnostic software. In various embodiments, cellular diagnostic software comprises software for determining the status of a cellular network (e.g., cellular network 101 of FIG. 1), software for determining the status of a cellular device (e.g., cellular device 100 of FIG. 1), software for sending diagnostic messages to a cellular device, software for displaying the status of a cellular network, software for displaying the status of a cellular device, or any other appropriate cellular diagnostic software. In some embodiments, cellular device software 308 comprises software for a network status display. In some embodiments, display 314 comprises a diagnostic display. In various embodiments, a diagnostic display comprises a display for displaying the status of a cellular network, a display for displaying the status of a cellular device, a display for displaying user interface information for diagnostic software, or a display for any other appropriate diagnostic information. In some embodiments, display 314 comprises a network status display.

Figure 4:
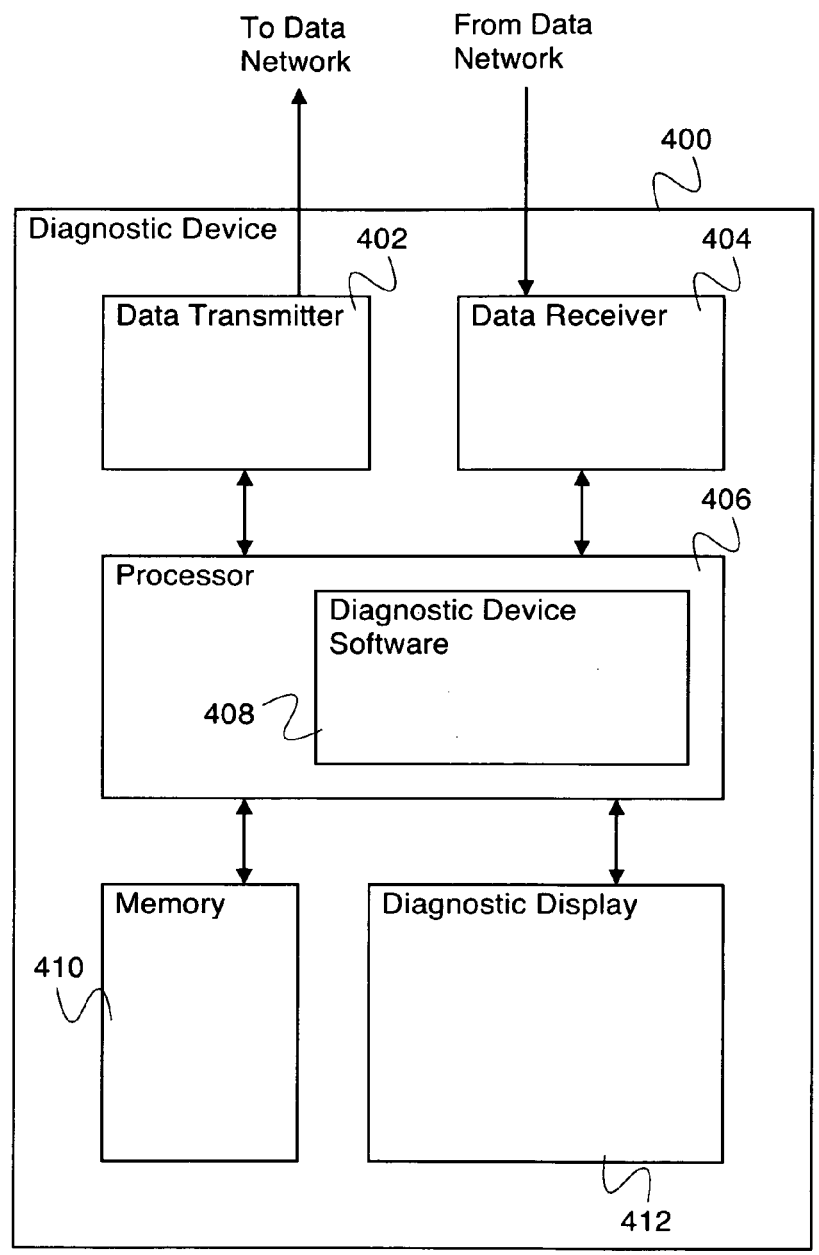
FIG. 4 is a block diagram illustrating an embodiment of a diagnostic device.

FIG. 4 is a block diagram illustrating an embodiment of a diagnostic device. In some embodiments, diagnostic device 400 comprises diagnostic device 120 of FIG. 1. In the example shown, diagnostic device 400 comprises data transmitter 302, data receiver 404, processor 406, memory 410, and diagnostic display 412. Data transmitter 402 and data receiver 404 communicate with a wireless network (e.g., wireless cellular network 101 of FIG. 1) via a data network (e.g., external data network 112 of FIG. 1). In some embodiments, diagnostic device 400 uses data transmitter 402 and data receiver 404 to communicate with a cellular device (e.g., cellular device 100) via a wireless network. In various embodiments, data transmitter 402 and/or data receiver 404 communicate data signals, voice signals, text signals (e.g., short message service (SMS)), configuration and/or registration signals, or any other appropriate kinds of signals. Data transmitter 402 and data receiver 404 receive instructions and communicate data with the rest of diagnostic device 400 via processor 406. Processor 406 controls diagnostic device 400. Processor 406 communicates with data transmitter 402 and data receiver 404, as well as with memory 410 and display 412. Processor 406 executes a set of instructions to control the device—for example, instructions in the form of software or code (e.g., designated as diagnostic device software 408 in FIG. 4). In some embodiments, diagnostic device software 408 is stored in digital memory (e.g., random access memory, read only memory, programmable read only memory, memory 410, or any other appropriate storage for storing software for processing by a processor). Memory 410 acts as temporary and/or long-term information storage for processor 406 as it is controlling diagnostic device 400. Diagnostic display 414 comprises a display for displaying information to a user. In various embodiments, information comprises device status information, user interface information, diagnostic information, network information, SMS information, or any other appropriate information.

In various embodiments, diagnostic device software comprises software for determining the status of a cellular network (e.g., cellular network 101 of FIG. 1), software for determining the status of a cellular device (e.g., cellular device 100 of FIG. 1), software for sending diagnostic messages to a cellular device, software for displaying the status of a cellular network, software for displaying the status of a cellular device, or any other appropriate cellular diagnostic software. In some embodiments, diagnostic device software 408 comprises software for a network status display. In various embodiments, a diagnostic display comprises a display for displaying the status of a cellular network, a display for displaying the status of a cellular device, a display for displaying user interface information for diagnostic software, or a display for any other appropriate diagnostic information. In some embodiments, display 412 comprises a network status display.

Figure 5A:
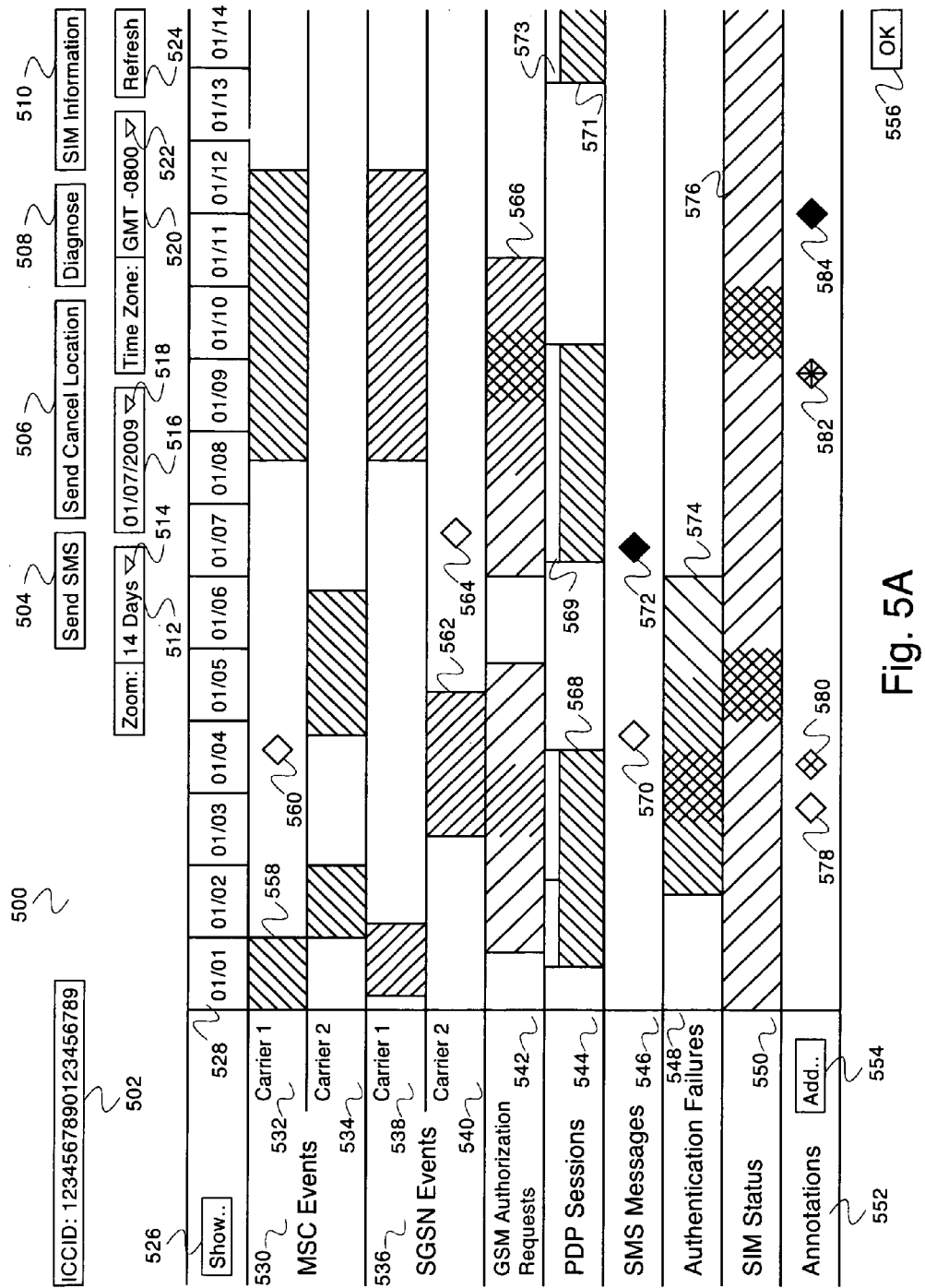
FIG. 5A is a diagram illustrating an embodiment of a network diagnostic display.

FIG. 5A is a diagram illustrating an embodiment of a network diagnostic display. In some embodiments, the network diagnostic display is part of the graphical user interface for displaying information of communication data streams as time-correlated lanes. In some embodiments, the network diagnostic display 500 displays the status of cellular device 100 of FIG. 1, identified by its SIM (e.g., SIM 312 of FIG. 3). In some embodiments, network diagnostic display 500 is displayed on a diagnostic device (e.g., cellular diagnostic device 114 of FIG. 1 or diagnostic device 120 of FIG. 1), on a diagnostic display (e.g., display 314 of FIG. 3 or diagnostic display 412 of FIG. 4). In the example shown, network diagnostic display 500 comprises displayed data and user interaction controls. Displayed data comprises ICCID 502, zoom display 512, date display 516, time zone display 520, dates 528, mobile switching center (MSC) events data 530, SGSN events data 536, GSM Authorization requests data 542, packet data protocol (PDP) sessions data 544, SMS messages data 546, PDP Context failures data 548, SIM status data 550, and annotations data 552. User interaction controls comprise send SMS button 504, send cancel location 506 button, diagnose button 508, SIM information button 510, zoom menu button 514, date menu button 518, time zone menu button 522, refresh button 524, show rows button 526, add annotation button 554, and OK button 556.

ICCID 502 comprises the ICCID for the SIM (e.g., SIM 312 of FIG. 3) associated with the cellular device whose data is displayed in display 500. Dates 528 comprise the dates over which data is displayed in the data rows. The range of dates 528 over which data is displayed is displayed in zoom display 512 and can be modified by a user by clicking on zoom menu button 514. In some embodiments, the available date ranges comprise 30 days, 14 days, 7 days, 3 days, 1 day, 12 hours, 4 hours, 30 minutes, and 5 minutes. In various embodiments, available date ranges include any other date ranges, include date ranges input by the user, or include date ranges set in any other appropriate way. In some embodiments, the default date range is one day. In some embodiments, the user interface also includes zoom in and zoom out buttons. Zoom in and zoom out buttons raise or lower the zoom level to the next appropriate zoom level with a single click by the user. In some embodiments, double clicking in a window is associated with a zoom in or zoom out command. The date upon which range of dates 528 is centered is displayed in date display 516 and can be modified by a user by clicking on date menu button 518. In some embodiments, clicking and dragging on the background of display 500 can modify the center of range of dates 528. In some embodiments, range of dates 528 defaults to display the most recently acquired data. The time zone to which range of dates 528 is referred is displayed in time zone display 520 and can be modified by a user by clicking on time zone menu button 522. In some embodiments, the time zone to which range of dates 528 is referred defaults to the current time zone in the physical location of the user. Data displayed in display 500 can be refreshed to the current time by clicking on refresh button 524.

In the example shown, display 500 includes one or more rows of data. The rows of data can include MSC Events data 530, SGSN Events data 536, GSM. Authorization Requests data 542, PDP Sessions data 544, SMS Messages data 546, Radius Failures data 548, SIM Status data 550, and Annotations data 552. A user can modify the set of rows displayed by clicking on show button 526. Show button 526 brings up a menu of data rows and allows the user to select whether each row should be displayed. MSC Events row 530 displays location updates for any MSCs (e.g. MSC 202 of FIG. 2) on which the SIM has registered in the currently displayed time range. If the SIM has registered with multiple MSCs during the displayed time range, one sub-row (e.g., sub-row 532 or sub-row 534) is displayed for each MSC the SIM has registered with. Each MSC Events data sub-row displays shaded areas (e.g., shaded area 558) corresponding to times when the SIM has been registered with the associated MSC. Each MSC Events data sub-row additionally displays icons (e.g., icon 560) corresponding to points in time when an unmatched register or disconnect event is found (e.g., a register or disconnect event without a disconnect or register event to match it to). SGSN Events row 536 displays location updates for any SGSNs (e.g., SGSN 252 of FIG. 2) on which the SIM has registered in the currently displayed time range. If the SIM has registered with multiple SGSNs during the displayed time range, one sub-row (e.g., sub-row 538 or sub-row 540) is displayed for each SGSN the SIM has registered with. Each SGSN Events data sub-row displays shaded areas (e.g., shaded area 562) corresponding to times when the SIM has been registered with the associated SGSN. Each SGSN Events data sub-row may additionally display icons (e.g., icon 564) corresponding to points in time when an unmatched register or disconnect event is found (e.g., a register or disconnect event without a disconnect or register event to match it to).

GSM Authorization Requests data row 542 displays GSM Authorization requests made during the displayed time range. A GSM Authorization request is a connection request made to an HLR (e.g., HLR 208 of FIG. 2). The GSM Authorization Requests data row displays shaded areas (e.g., shaded area 566) or colored areas corresponding to times where GSM Authorization requests are made. The shade or color of the shaded or colored area corresponds to the number of GSM Authorization requests made in the displayed time period. In some embodiments, a light shade or a green color corresponds to between 1 and 30 requests made in the time period, a medium shade or a yellow color corresponds to between 31 and 100 requests made in the time period, and a dark shade or a red color corresponds to more than 100 requests made in the time period.

PDP Sessions data row 544 displays PDP sessions established for the SIM within the displayed time range. The PDP Sessions data row displays shaded areas (e.g., shaded area 568) corresponding to open PDP sessions for the SIM during the currently displayed time range. The PDP Sessions data row also displays boxes (e.g., box 569) overlaid with the shaded areas corresponding to call detail records (CDR's) (e.g., CDR's established by charging gateway function 256 of FIG. 2). If multiple CDR's exist for a single PDP sessions, boxes corresponding to the multiple CDR's are drawn adjacent to one another. Open PDP session box 571 corresponds to a currently open PDP session, and open CDR session 573 corresponds to its associated open CDR. SMS Messages data row 546 displays SMS (e.g., short message service) messages sent to or from the SIM within the displayed time range. The SMS Messages data row displays icons (e.g., icon 570 or icon 572) corresponding to sent or received SMS messages. In some embodiments, an empty or white icon (e.g., icon 570) corresponds to a sent SMS message and a filled or blue icon (e.g., icon 572) corresponds to a received SMS message. Authentication Failures data row 548 displays failed attempts to establish data sessions during the time range. The Authentication Failures data row displays shaded areas (e.g., shaded area 574) or colored areas corresponding to failed attempts to establish data sessions. In some embodiments, a light shade or a green color corresponds to between 1 and 10 authentication failures within a given time period, a medium shade or a yellow color corresponds to between 10 and 30 authentication failures within a given time period, and a dark shade or a red bar corresponds to more than 30 authentication failures within a given time period.

SIM Status data row 550 displays the ability of the SIM to establish a data session within the displayed time range. The SIM Status data row displays shaded areas (e.g., shaded area 576) or colored areas corresponding to the ability of the SIM to establish a data session. In some embodiments, a light shade or a green color corresponds to the SIM having the ability to establish a data session, and a dark shade or a red color corresponds to the SIM not having the ability to establish a data session. Annotations data row 552 displays notes describing event history made at given points in time. The Annotations data row displays icons (e.g., icon 578, icon 580, icon 582, or icon 584) corresponding to notes describing event history. In some embodiments, a filled or blue icon (e.g., icon 584) corresponds to a manual annotation, an empty or white icon (e.g., icon 578) corresponds to automatically retrieved SIM information, a lightly shaded or green icon (e.g., icon 580) corresponds to a diagnostic result with no expected connectivity issues, and a darkly shaded or red icon (e.g., icon 582) corresponds to a diagnostic result with expected connectivity issues. A user can add a manual annotation to Annotations data row 552 by clicking Add button 554.

A user of the display system can send an SMS message to the cellular device associated with the SIM by clicking Send SMS button 504. In various embodiments, an SMS message can be used for communication with the person possessing the cellular device, to test communication with the cellular device, to send a diagnostic message to the device, or for any other appropriate purpose. A user of the display system can send a cancel location message to the cellular device associated with the SIM by clicking Cancel Location button 506. The cancel location message causes the cellular device to cancel its current MSC location registration. A user of the display system can start a diagnostic process on the cellular device associated with the SIM by clicking Diagnose button 508. The diagnostic is an automatic process on the cellular device for determining connectivity problems. In some embodiments, the diagnostic process requires additional information from the user of the display system and prompts the user for the required information. The user can request attribute information from the cellular device associated with the SIM by clicking SIM Information button 510. Clicking the button displays the last known values of SIM attributes and allows the user to request them to be updated. In some embodiments, the SIM attributes comprise forbidden public land mobile networks (FPLMN), location information for the global packet radio system (LOCIGPRS), location information (LOCI,) and public land mobile network selector (PLMNsel).

FIG. 5B is a diagram illustrating an embodiment of a table of communication data stream information. In some embodiments, the table of FIG. 5B is a table for displaying information extracted from one or more communications data streams. In the example shown, the table includes column 500 (e.g., with label Time), column 502 (e.g., with label Event Type), column 504 (e.g., with label Device), column 506 (e.g., with label Network Element), and column 508 (e.g., with label Comments). The table includes row 510 (e.g., with label 12:30 PM on Jan. 1, 1901), row 512 (e.g., with label 12:45 PM on Jan. 1, 1901), and row 514 (e.g., with label 12:30 PM on Jan. 1, 1901), Column 502 entries are: A for row 510, B for row 512, and A for row 514. Column 504 entries are: 1 for row 510, 1 for row 512, and 2 for row 514. There are no entries for column 508 in row 510, row 512, or row 514.

Figure 6:
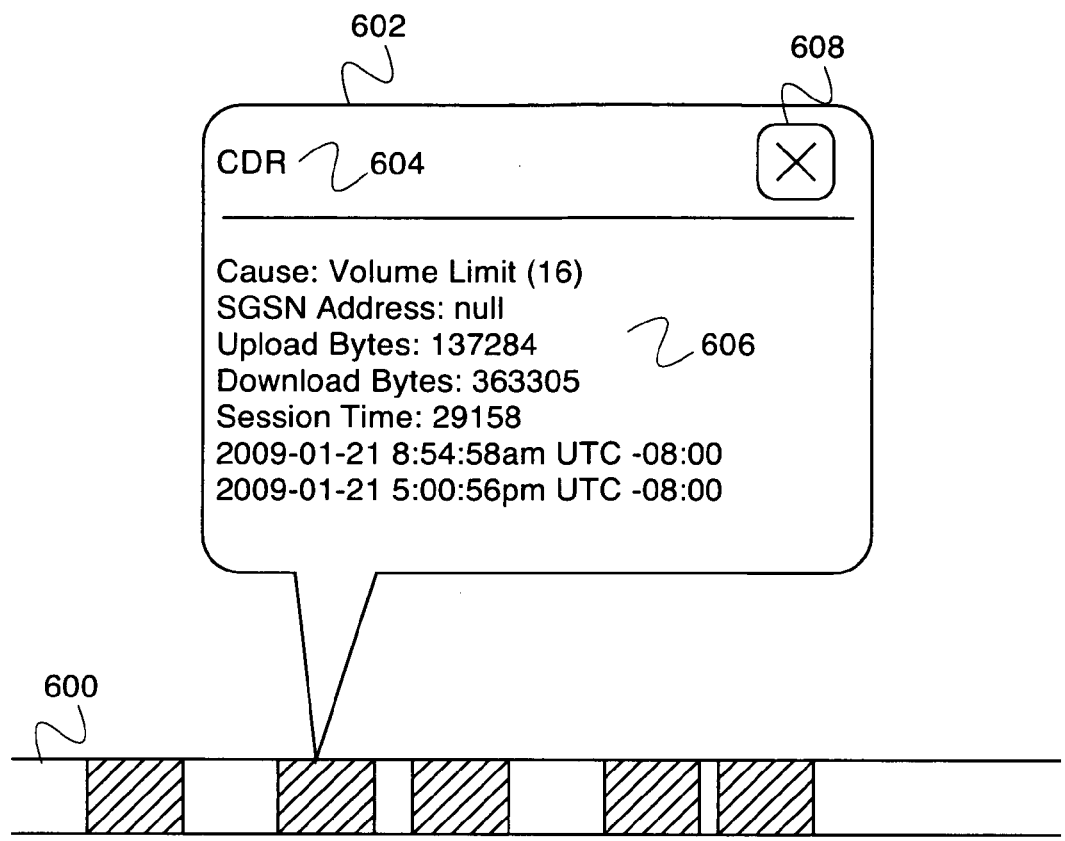
FIG. 6 is a diagram illustrating an embodiment of a data popup window.

FIG. 6 is a diagram illustrating an embodiment of a data popup window. In the example shown, data row 600 is a data row (e.g., MSC Events data row 530 of FIG. 5A, SGSN Events data row 536 of FIG. 5A, HLR Requests data row 542 of FIG. 5A, PDP Sessions data row 544 of FIG. 5A, SMS Messages data row 546 of FIG. 5A, Authentication Failures data row 548 of FIG. 5A, SIM Status data row 550 of FIG. 5A, or Annotations data row 552 of FIG. 5A). Data popup window 602 displays data. In some embodiments, data row 600 and data popup window 602 are part of a network diagnostic display (e.g., network diagnostic display 500 of FIG. 5A). In some embodiments, data popup window 602 is displayed when a user clicks on an event in data row 600. In some embodiments, data popup window 602 displays attributes of the clicked event. In the example shown, title 604 comprises a title for a set of attributes of a clicked event, and data 606 comprises a set of attributes of a clicked event. Close box 608 causes the popup window to close when it is clicked.

In some embodiments, data row 600 comprises MSC Events data row 530 of FIG. 5. If a user clicks on a shaded area (e.g., shaded area 558 of FIG. 5A) in MSC Events data row 530 of FIG. 5A, a popup window (e.g., popup window 602) is displayed. The title of the popup window comprises the global title (GT) address of the session, and the data in the popup window comprises the event type (e.g., "Location Update"), the carrier, the GT address, the IMSI number, the initial location update date and time, and the cancel location date and time. If the user clicks on an icon (e.g., icon 560 of FIG. 5A) in MSC Events data row 530 of FIG. 5A, a popup window is displayed. The title of the popup window comprises the GT address of the session, and the data in the popup window comprises the event type (e.g., "Location Update"), the carrier, the GT address, the IMSI number, and the event date and time.

In some embodiments, data row 600 comprises SGSN Events data row 536 of FIG. 5A. If a user clicks on a shaded area (e.g., shaded area 562 of FIG. 5A) in SGSN Events data row 536 of FIG. 5A, a popup window (e.g., popup window 602) is displayed. The title of the popup window comprises the GT address of the session, and the data in the popup window comprises the event type (e.g., "Location Update"), the carrier, the GT address, the IMSI number, the initial location update date and time, and the cancel location date and time. If the user clicks on an icon (e.g., icon 564 of FIG. 5A) in SGSN Events data row 536 of FIG. 5A, a popup window is displayed. The title of the popup window comprises the GT address of the session, and the data in the popup window comprises the event type (e.g., "Location Update"), the carrier, the GT address, the IMSI number, and the event date and time.

In some embodiments, data row 600 comprises GSM Authorization Requests data row 542 of FIG. 5A. If a user clicks on a shaded area (e.g., shaded area 566 of FIG. 5A) in MSC Events data row 530 of FIG. 5A, a popup window (e.g., popup window 602) is displayed. The title of the popup window comprises the number of GSM Authorization requests in the displayed time period, and the data in the popup window comprises the GSM Authorization request limit for the displayed color, the start date and time for the displayed time period, and the end date and time for the displayed time period.

In some embodiments, data row 600 comprises PDP Sessions data row 544 of FIG. 5A. If a user clicks on a shaded area (e.g., shaded area 568 of FIG. 5A) in PDP Sessions data row 544 of FIG. 5A, a popup window (e.g., popup window 602) is displayed. The title of the popup window comprises the number of GSM Authorization requests in the displayed time period, and the data in the popup window comprises the GSM Authorization request limit for the displayed color, the start date and time for the displayed time period, and the end date and time for the displayed time period. If a user clicks on a box corresponding to a CDR (e.g., box 569 of FIG. 5A), a popup window is displayed. The title of the popup window comprises the text "CDR", and the data in the popup window comprises the cause for the CDR closing, the SGSN GT address, the number of upload bytes during the CDR, the number of download bytes during the CDR, the session duration, the CDR start date and time, and the CDR end date and time.

In some embodiments, data row 600 comprises SMS Messages data row 546 of FIG. 5A. If a user clicks on an icon (e.g., icon 570 or icon 572 of FIG. 5A), a popup window (e.g., popup window 602) is displayed. The title of the popup window comprises the text "SMS MO" for an outgoing SMS message, and the title of the popup window comprises the text "SMS MT" for an incoming SMS message. The data in the popup window comprises the message status, the MSISDN to which the message was sent, the MSISDN from which the message was sent, and the date and time the message was sent.

In some embodiments, data row 600 comprises Authentication Failures data row 548 of FIG. 5A. If a user clicks on a shaded area (e.g., shaded area 574 of FIG. 5A), a popup window (e.g., popup window 602) is displayed. The title of the popup window comprises the number of authentication failures in the displayed time period, and the data in the popup window comprises the authentication failure limit for the displayed color, the start date and time for the displayed time period, and the end date and time for the displayed time period.

In some embodiments, data row 600 comprises SIM Status data row 550 of FIG. 5A. If a user clicks on a shaded area (e.g., shaded area 576 of FIG. 5A), a popup window (e.g., popup window 602) is displayed. The title of the popup window comprises the text "SIM Status", and the data in the popup window comprises the status of the SIM state at the time corresponding to the click, the status of the suspended state at the time corresponding to the click, the status of the overage limit at the time corresponding to the click, the status of the overage limit override at the time corresponding to the click, the date and time when this combination of settings took effect, and the date and time when this combination of settings changed.

In some embodiments, data row 600 comprises Annotations data row 552 of FIG. 5A. If a user clicks on an icon (e.g., icon 578, icon 580, icon 582, or icon 584 of FIG. 5A), a popup window (e.g., popup window 602) is displayed. The title of the popup window comprises the text "Annotation", and the data in the popup window comprises the text of the annotation. The popup window additionally comprises links that allow a user to delete or edit the annotation.

Figure 7A:
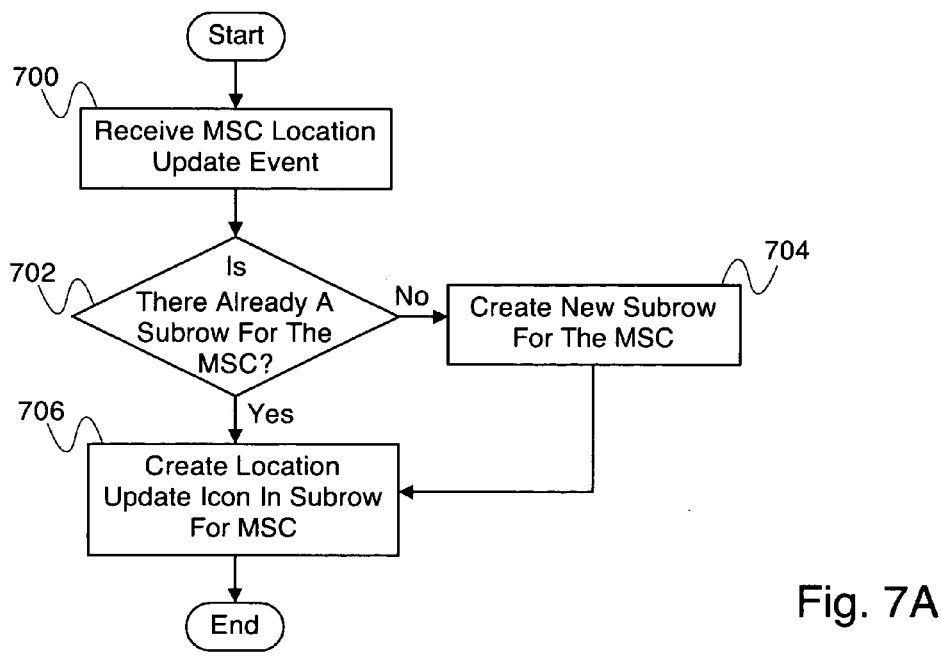
FIG. 7A is a flow diagram illustrating an embodiment of a process for updating a network status display in response to an MSC location update event.

FIG. 7A is a flow diagram illustrating an embodiment of a process for updating a network status display in response to an MSC location update event. In some embodiments, the network status display is network status display 500 of FIG. 5A. In the example shown, in 700, an MSC location update event is received. In 702, it is determined if there is already a subrow in the network status display for the MSC associated with the MSC location update event. If there is not already a subrow in the network status display for the MSC associated with the MSC location update event, control passes to 704, where a new subrow in the network status display is created. The new subrow in the network status display is for the MSC associated with the MSC location update event. Control then passes to 706. If there is already a subrow in the network status display for the MSC associated with the MSC location update event, control passes directly to 706. In 706, a location update icon (e.g., icon 560 of FIG. 5A) is created in the subrow for the MSC associated with the MSC location update event (e.g., subrow 532 of MSC Events data row 530 of FIG. 5A), and the process ends.

Figure 7B:
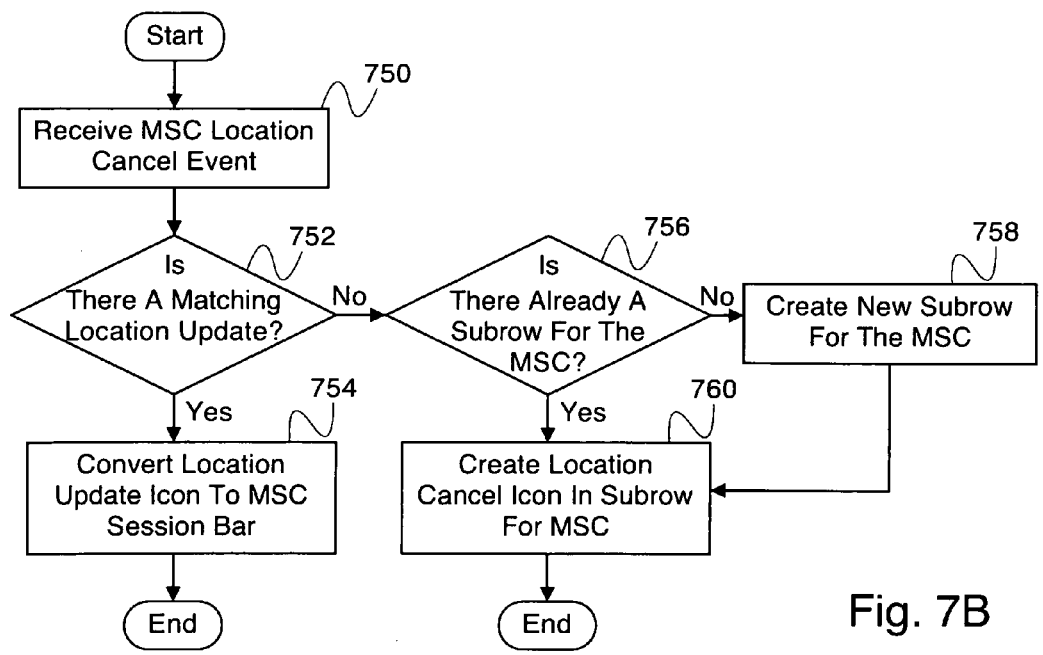
FIG. 7B is a flow diagram illustrating an embodiment of a process for updating a network status display in response to an MSC location cancel event.

FIG. 7B is a flow diagram illustrating an embodiment of a process for updating a network status display in response to an MSC location cancel event. In some embodiments, the network status display is network status display 500 of FIG. 5A. In the example shown, in 700, an MSC location cancel event is received. In 752, it is determined if there is a matching location update. If there is a location update event that can be matched to the location cancel event to form an MSC session, control passes to 754. In 754, the location update icon is converted to an MSC session bar (e.g., MSC session bar 558 of FIG. 5A). The MSC session bar begins at the point of the location update icon and ends at the time associated with the MSC location cancel event. If a matching location update is not found in 752, control passes to 756. In 756, it is determined if there is already a subrow in the network status display for the MSC associated with the MSC location cancel event. If there is not already a subrow in the network status display for the MSC associated with the MSC location cancel event, control passes to 758, where a new subrow in the network status display is created. The new subrow in the network status display is for the MSC associated with the MSC location cancel event. Control then passes to 760. If there is already a subrow in the network status display for the MSC associated with the MSC location cancel event, control passes directly to 760. In 760, a location cancel icon (e.g., icon 560 of FIG. 5A) is created in the subrow for the MSC associated with the MSC location update event (e.g., subrow 532 of MSC Events data row 530 of FIG. 5A), and the process ends.

Figure 8A:
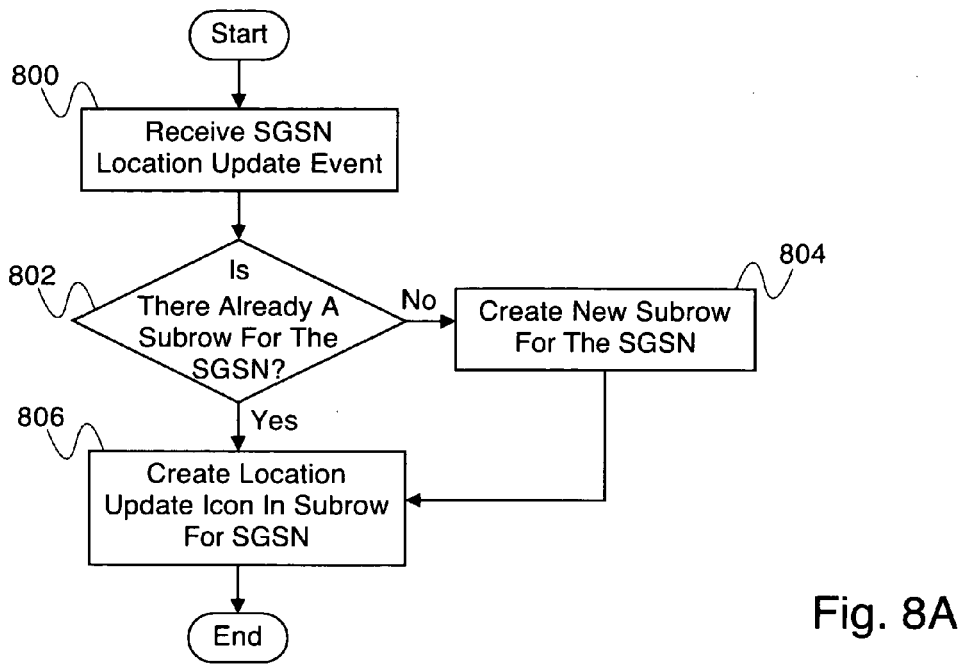
FIG. 8A is a flow diagram illustrating an embodiment of a process for updating a network status display in response to an SGSN location update event.

FIG. 8A is a flow diagram illustrating an embodiment of a process for updating a network status display in response to an SGSN location update event. In some embodiments, the network status display is network status display 500 of FIG. 5A. In the example shown, in 800, an SGSN location update event is received. In 802, it is determined if there is already a subrow in the network status display for the SGSN associated with the SGSN location update event. If there is not already a subrow in the network status display for the SGSN associated with the SGSN location update event, control passes to 804, where a new subrow in the network status display is created. The new subrow in the network status display is for the SGSN associated with the SGSN location update event. Control then passes to 806. If there is already a subrow in the network status display for the SGSN associated with the SGSN location update event, control passes directly to 806. In 806, a location update icon (e.g., icon 564 of FIG. 5A) is created in the subrow for the SGSN associated with the SGSN location update event (e.g., subrow 540 of SGSN Events data row 546 of FIG. 5A), and the process ends.

Figure 8B:
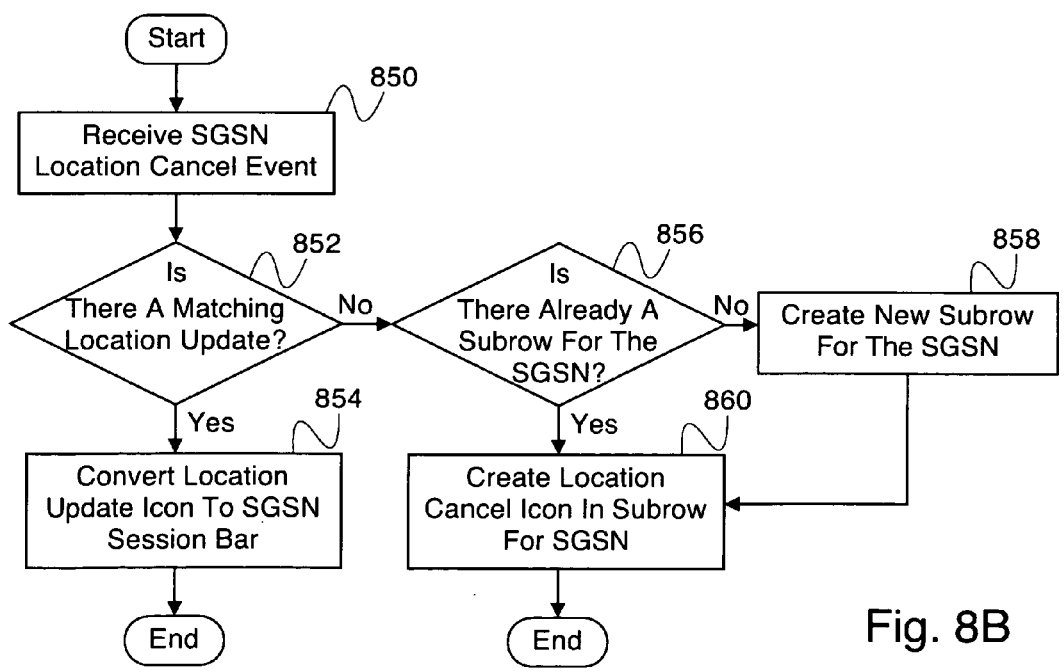
FIG. 8B is a flow diagram illustrating an embodiment of a process for updating a network status display in response to an SGSN location cancel event.

FIG. 8B is a flow diagram illustrating an embodiment of a process for updating a network status display in response to an SGSN location cancel event. In some embodiments, the network status display is network status display 500 of FIG. 5A. In the example shown, in 800, an SGSN location cancel event is received. In 852, it is determined if there is a matching location update. If there is a location update event that can be matched to the location cancel event to form an SGSN session, control passes to 854. In 854, the location update icon is converted to an SGSN session bar (e.g., SGSN session bar 562 of FIG. 5A). The SGSN session bar begins at the point of the location update icon and ends at the time associated with the SGSN location cancel event. If a matching location update is not found in 852, control passes to 856. In 856, it is determined if there is already a subrow in the network status display for the SGSN associated with the SGSN location cancel event. If there is not already a subrow in the network status display for the SGSN associated with the SGSN location cancel event, control passes to 858, where a new subrow in the network status display is created. The new subrow in the network status display is for the SGSN associated with the SGSN location cancel event. Control then passes to 860. If there is already a subrow in the network status display for the SGSN associated with the SGSN location cancel event, control passes directly to 860. In 860, a location cancel icon (e.g., icon 564 of FIG. 5A) is created in the subrow for the SGSN associated with the SGSN location update event (e.g., subrow 540 of SGSN Events data row 546 of FIG. 5A), and the process ends.

Figure 9:
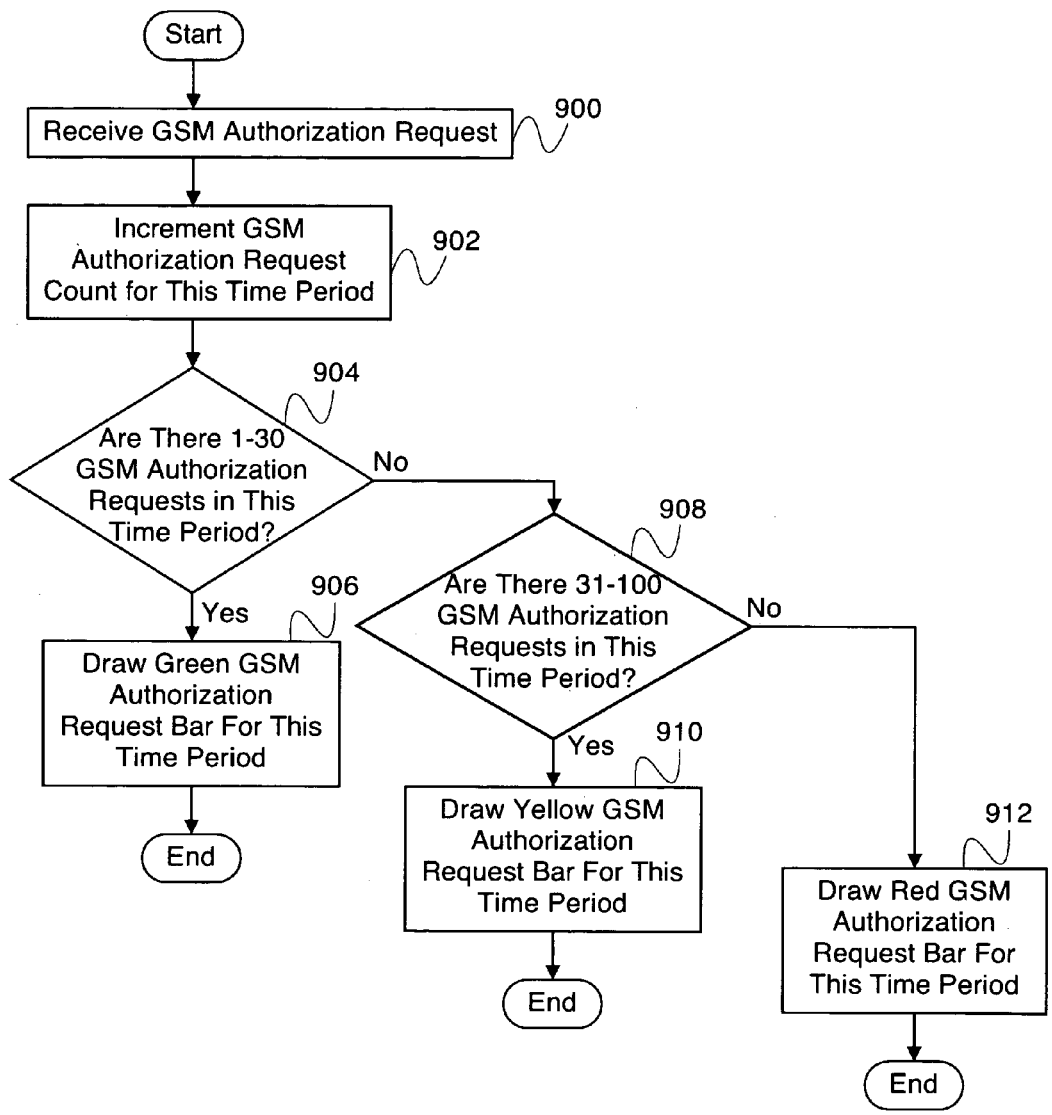
FIG. 9 is a flow diagram illustrating an embodiment of a process for updating a network status display in response to a GSM Authorization request.

FIG. 9 is a flow diagram illustrating an embodiment of a process for updating a network status display in response to a GSM Authorization request. In some embodiments, the network status display is network status display 500 of FIG. 5A. In the example shown, in 900, a GSM Authorization request is received. In 902, the GSM Authorization request count is incremented for this time period. In 904, the GSM Authorization request count is checked to see if there are between 1 and 30 GSM Authorization requests in this time period. If there are between 1 and 30 GSM Authorization requests in this time period, control passes to 906. In 906, a green GSM Authorization request bar (e.g., GSM Authorization request bar 566 of FIG. 5A) is drawn for this time period in the GSM Authorization Requests data row (e.g., GSM Authorization Requests data row 542 of FIG. 5A), and the process ends. If there are not between 1-30 GSM Authorization requests in this time period, control passes to 908. In 908, the GSM Authorization request count is checked to see if there are between 31 and 100 GSM Authorization requests in this time period. If there are between 31 and 100 GSM Authorization requests in this time period, control passes to 910. In 910, a yellow GSM Authorization request bar is drawn for this time period in the GSM Authorization Requests data row, and the process ends. If there are not between 31-100 GSM Authorization requests in this time period, control passes to 912. In 912, there must be more than 100 GSM Authorization requests in this time period. A red GSM Authorization request bar is drawn for this time period in the GSM Authorization Requests data row, and the process ends.

Figure 10A:
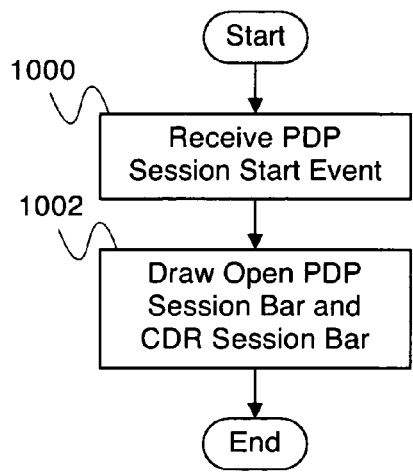
FIG. 10A is a flow diagram illustrating an embodiment of a process for updating a network status display in response to a PDP session start event.

FIG. 10A is a flow diagram illustrating an embodiment of a process for updating a network status display in response to a PDP session start event. In some embodiments, the network status display is network status display 500 of FIG. 5A. In the example shown, in 1000, a PDP session start event is received. In 1002, an open PDP session bar and CDR session bar (e.g., open PDP session bar 571 of FIG. 5A) are drawn in the PDP sessions data row (e.g., PDP sessions data row 544 of FIG. 5A), and the process ends.

Figure 10B:
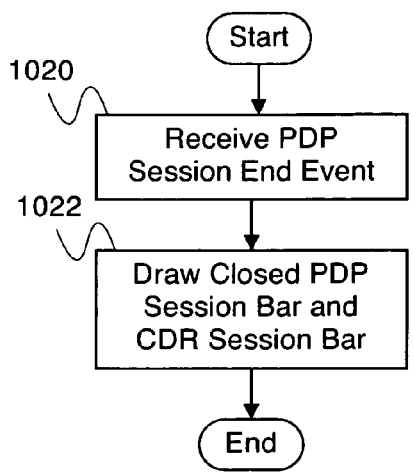
FIG. 10B is a flow diagram illustrating an embodiment of a process for updating a network status display in response to a PDP session end event.

FIG. 10B is a flow diagram illustrating an embodiment of a process for updating a network status display in response to a PDP session end event. In some embodiments, the network status display is network status display 500 of FIG. 5A. In the example shown, in 1020, a PDP session end event is received. In 1022, a closed PDP session bar and CDR session bar (e.g., PDP session bar 568 of FIG. 5A) are drawn in the PDP sessions data row (e.g., PDP sessions data row 544 of FIG. 5A), and the process ends.

Figure 10C:
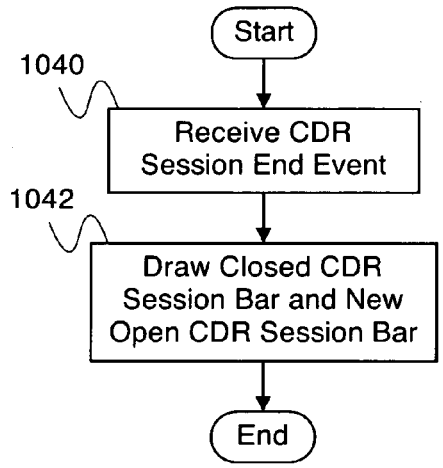
FIG. 10C is a flow diagram illustrating an embodiment of a process for updating a network status display in response to a CRD session end event.

FIG. 10C is a flow diagram illustrating an embodiment of a process for updating a network status display in response to a CRD session end event. In some embodiments, the network status display is network status display 500 of FIG. 5A. In the example shown, in 1040, a CDR session end event is received. In 1042, a closed CDR session bar (e.g., closed CDR session bar 569 of FIG. 5A) and a new open CDR session bar (e.g., open CDR session bar 573 of FIG. 5A) are drawn in the PDP sessions data row (e.g., PDP sessions data row 544 of FIG. 5A), and the process ends.

Figure 11A:
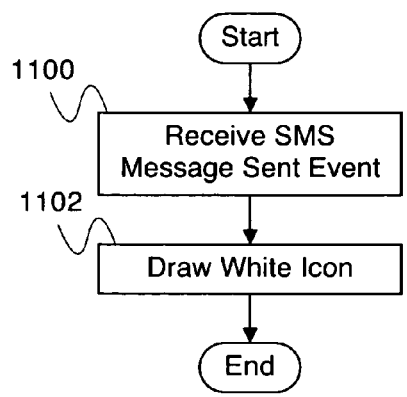
FIG. 11A is a flow diagram illustrating an embodiment of a process for updating a network status display in response to a SMS message received event.

FIG. 11A is a flow diagram illustrating an embodiment of a process for updating a network status display in response to a SMS message received event. In some embodiments, the network status display is network status display 500 of FIG. 5A. In the example shown, in 1100, a SMS message sent event is received. In 1102, a white icon (e.g., icon 570 of FIG. 5A)

is drawn in the SMS Messages received data row (e.g., SMS Messages received data row 546 of FIG. 5A), and the process' ends.

Figure 11B:
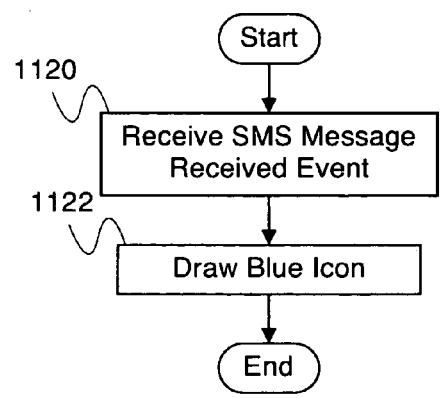
FIG. 11B is a flow diagram illustrating an embodiment of a process for updating a network status display in response to a SMS message sent event.

FIG. 11B is a flow diagram illustrating an embodiment of a process for updating a network status display in response to a SMS message sent event. In some embodiments, the network status display is network status display 500 of FIG. 5A. In the example shown, in 1120, a SMS message received event is received. In 1122, a blue icon (e.g., icon 572 of FIG. 5A) is drawn in the SMS Messages received data row (e.g., SMS Messages received data row 546 of FIG. 5A), and the process ends.

Figure 12:
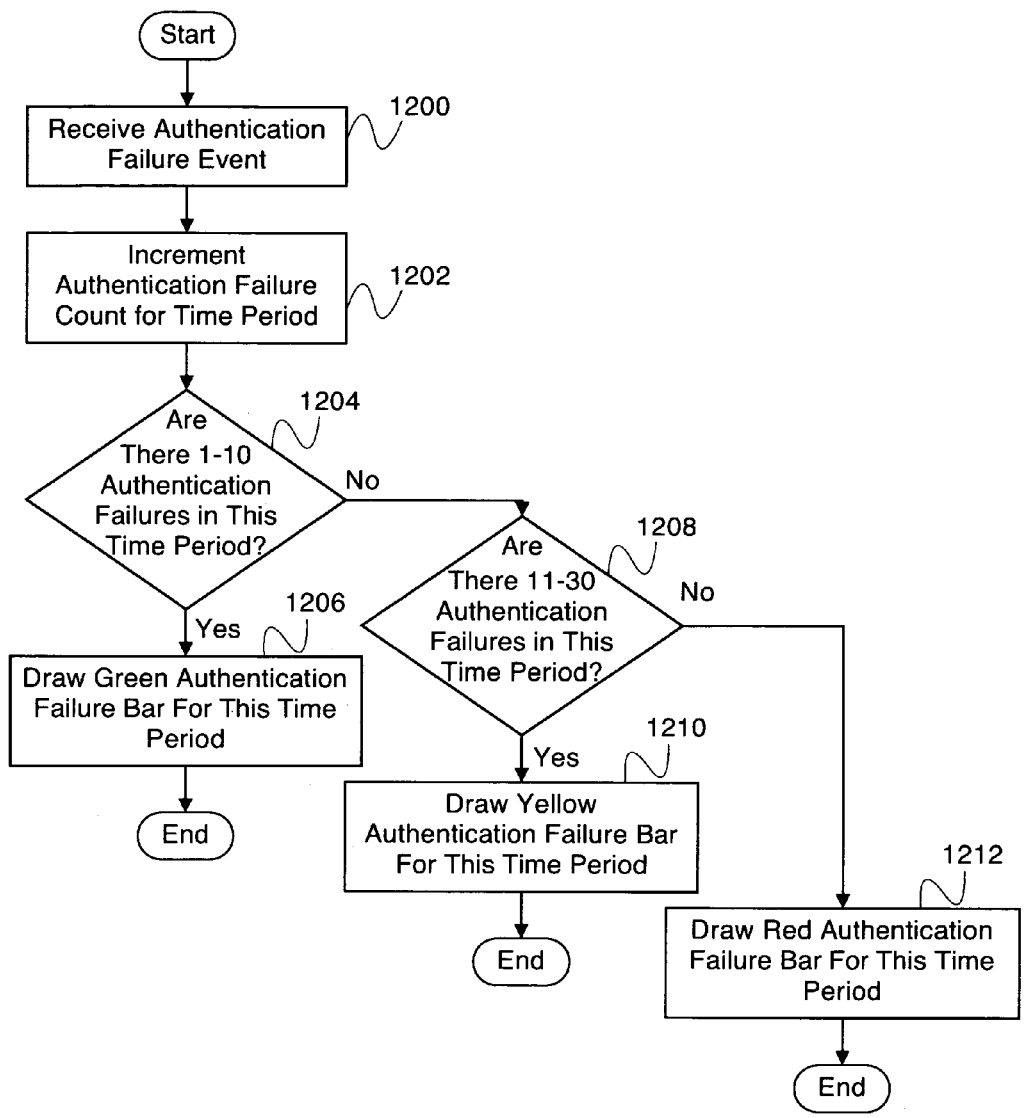
FIG. 12 is a flow diagram illustrating an embodiment of a process for updating a network status display in response to an authentication failure event.

FIG. 12 is a flow diagram illustrating an embodiment of a process for updating a network status display in response to an authentication failure event. In some embodiments, the network status display is network status display 500 of FIG. 5A. In the example shown, in 1200, an authentication failure event is received. In 1202, the authentication failure count is incremented for this time period. In 1204, the authentication failure count is checked to see if there are between 1 and 10 authentication failures in this time period. If there are between 1 and 10 authentication failures in this time period, control passes to 1206. In 1206, a green authentication failure bar (e.g., authentication failure bar 574 of FIG. 5A) is drawn for this time period in the Authentication Failures data row (e.g., Authentication Failures data row 548 of FIG. 5), and the process ends. If there are not between 1-10 authentication failures in this time period, control passes to 1208. In 1208, the authentication failures count is checked to see if there are between 11 and 30 authentication failures in this time period. If there are between 11 and 30 authentication failures in this time period, control passes to 1210. In 1210, a yellow authentication failure bar is drawn for this time period in the Authentication Failures data row, and the process ends. If there are not between 11-30 authentication failures in this time period, control passes to 1212. In 1212, there must be more than 30 authentication failures in this time period. A red authentication failures bar is drawn for this time period in the Authentication Failures data row, and the process ends.

Figure 13:
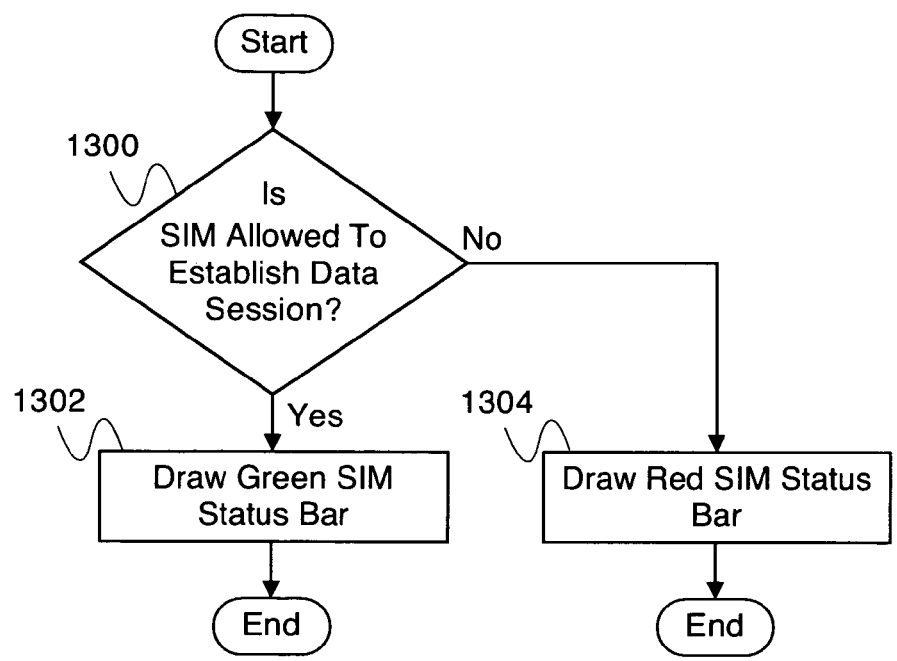
FIG. 13 is a flow diagram illustrating an embodiment of a process for updating a network status display with the current SIM status.

FIG. 13 is a flow diagram illustrating an embodiment of a process for updating a network status display with the current SIM status. In some embodiments, the network status display is network status display 500 of FIG. 5A. In the example shown, in 1300, the SIM status is checked to determine if the SIM is allowed to establish a data session. If the SIM is allowed to establish a data session, control passes to 1302. In 1302, a green SIM status bar (e.g., SIM status bar 576 of FIG. 5A) is drawn in the SIM Status data row (e.g., SIM Status data row 550 of FIG. 5A), and the process ends. In 1300, if the SIM is determined to not be allowed to establish a data session, control passes to 1304. In 1304, a red SIM status bar is drawn in the SIM Status data row, and the process ends.

Figure 14:
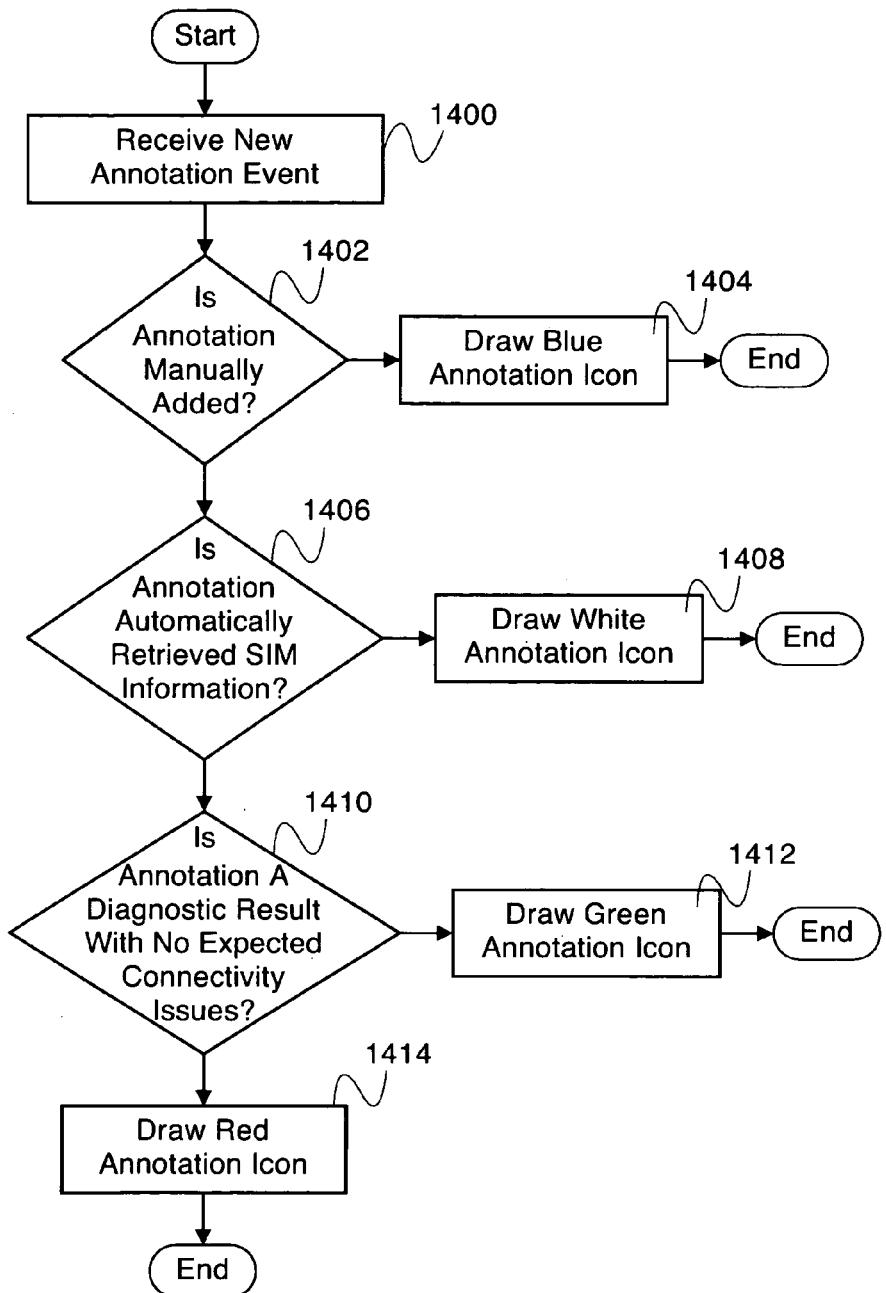
FIG. 14 is a flow diagram illustrating an embodiment of a process for updating a network status display in response to an annotation event.

FIG. 14 is a flow diagram illustrating an embodiment of a process for updating a network status display in response to an annotation event. In some embodiments, the network status display is network status display 500 of FIG. 5A. In the example shown, in 1400, a new annotation event is received. In 1402, the annotation is checked to see if it is manually added. If the annotation was determined to be manually added, control passes to 1404. In 1404, a blue annotation icon (e.g., annotation icon 584 of FIG. 5A) is drawn in the Annotations data row (e.g., Annotations data row 552 of FIG. 5), and the process ends. If the annotation was not determined to be manually added, control passes to 1406. In 1406, the annotation is checked to see if it is automatically retrieved SIM information. If the annotation is determined to be automatically retrieved SIM information, control passes to 1408.

In 1408, a white annotation icon (e.g., annotation icon 578 of FIG. 5A) is drawn in the Annotations data row, and the process ends. If the annotation is not determined to be automatically retrieved SIM information in 1406, control passes to 1410. In 1410, the annotation is checked to see if it is a diagnostic result with no expected connectivity issues. If the annotation is determined to be a diagnostic result with no expected connectivity issues, control passes to 1412. In 1412, a green annotation icon (e.g., annotation icon 580 of FIG. 5A) is drawn in the Annotations data row, and the process ends. If the annotation is not determined to be a diagnostic result with no expected connectivity issues, control passes to 1414. The annotation is then determined to be a diagnostic result with expected connectivity issues. In 1414, a red annotation icon (e.g., annotation 582 of FIG. 5A) is drawn in the Annotations data row, and the process ends.

Figure 15:
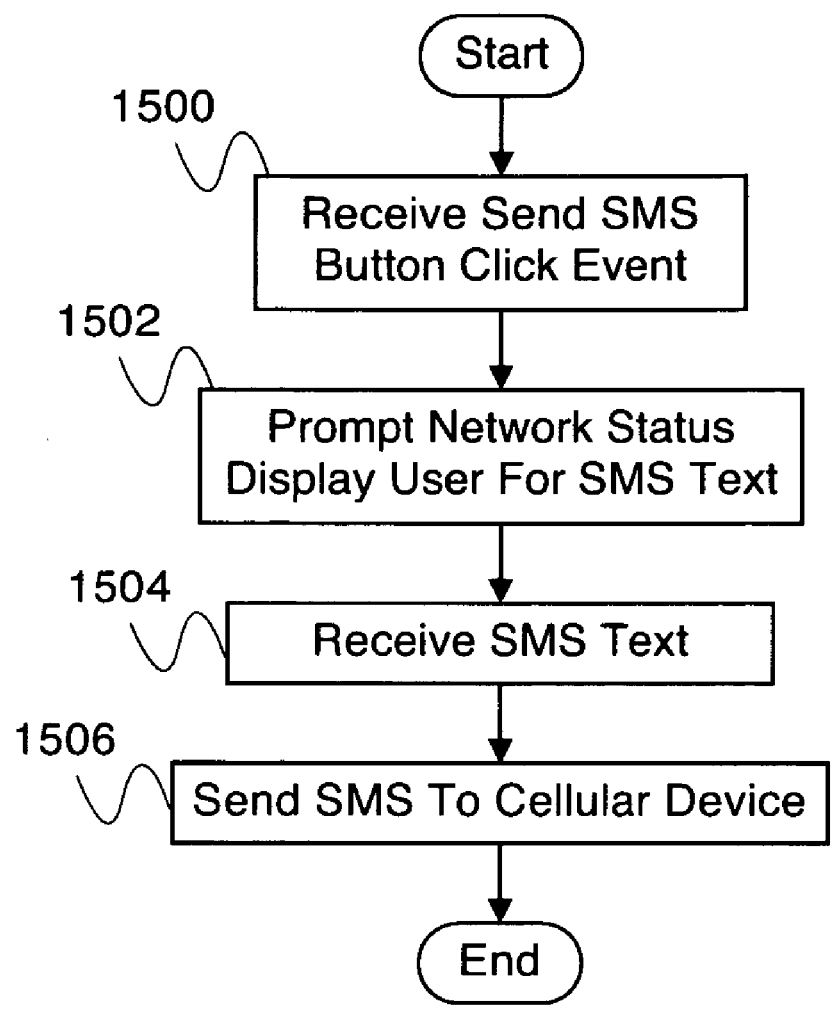
FIG. 15 is a flow diagram illustrating an embodiment of a process for a network status display to respond to a send SMS button click event.

FIG. 15 is a flow diagram illustrating an embodiment of a process for a network status display to respond to a send SMS button click event. In some embodiments, the network status display is network status display 500 of FIG. 5A. In some embodiments, the send SMS button is send SMS button 504 of FIG. 5A. In the example shown, in 1500, a send SMS button click event is received. In 1502, the network status display user is prompted for the SMS text. In 1504, the SMS text is received. In 1506, an SMS is sent to the cellular device associated with the network status display (e.g., cellular device 100 of FIG. 1) containing the received text, and the process ends.

Figure 16:
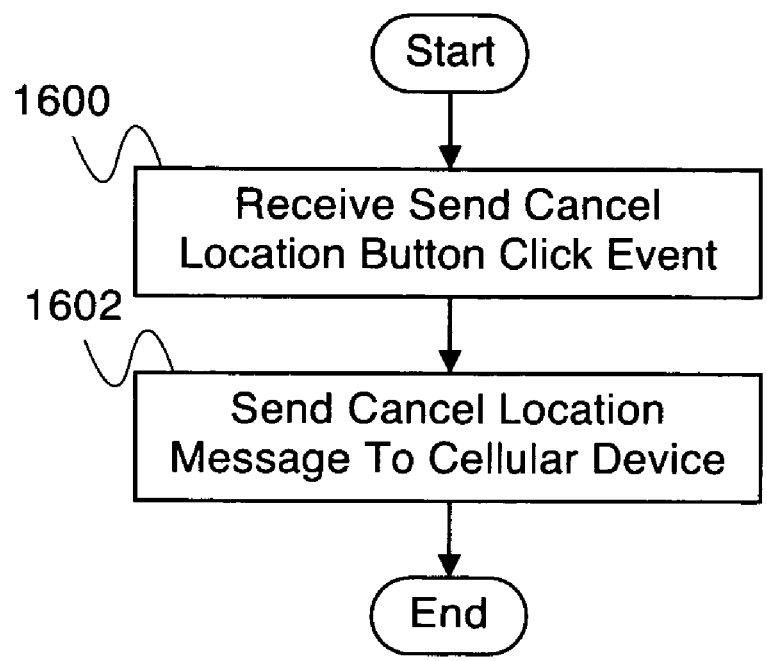
FIG. 16 is a flow diagram illustrating an embodiment of a process for a network status display to respond to a send cancel location button click event.

FIG. 16 is a flow diagram illustrating an embodiment of a process for a network status display to respond to a send cancel location button click event. In some embodiments, the network status display is network status display 500 of FIG. 5A. In some embodiments, the send cancel location button is send cancel location button 506 of FIG. 5A. In the example shown, in 1600, a send cancel location button click event is received. In 1602, a cancel location message is sent to the cellular device associated with the network status display (e.g., cellular device 100 of FIG. 1), and the process ends.

Figure 17:
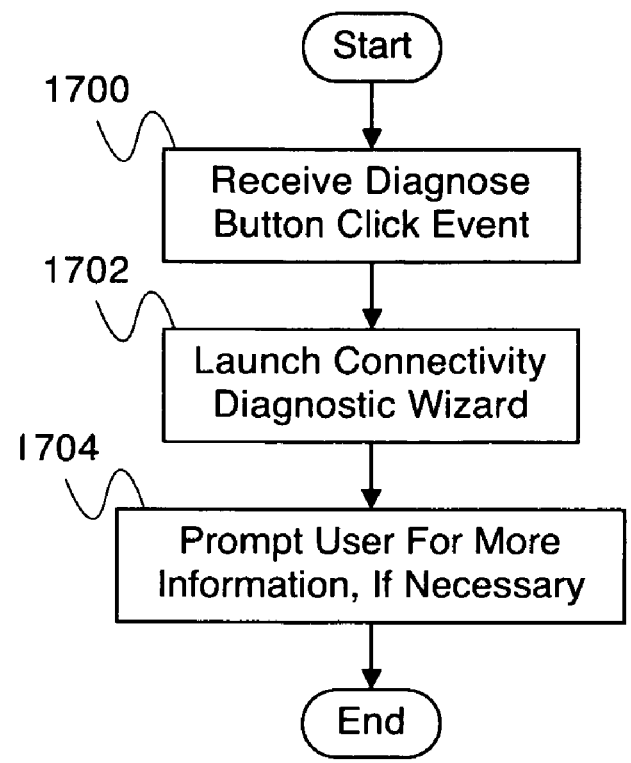
FIG. 17 is a flow diagram illustrating an embodiment of a process for a network status display to respond to a diagnose button click event.

FIG. 17 is a flow diagram illustrating an embodiment of a process for a network status display to respond to a diagnose button click event. In some embodiments, the network status display is network status display 500 of FIG. 5A. In some embodiments, the diagnose button is diagnose button 508 of FIG. 5A. In the example shown, in 1700, a diagnose button click event is received. In 1702, a connectivity diagnostic wizard is launched by the network status display. In some embodiments, the connectivity diagnostic wizard contains automated logic for assessing the ability to connect of the cellular device associated with the network status display (e.g., cellular device 100 of FIG. 1). In 1704, the user is prompted for more information, if necessary, and the process ends.

Figure 18:
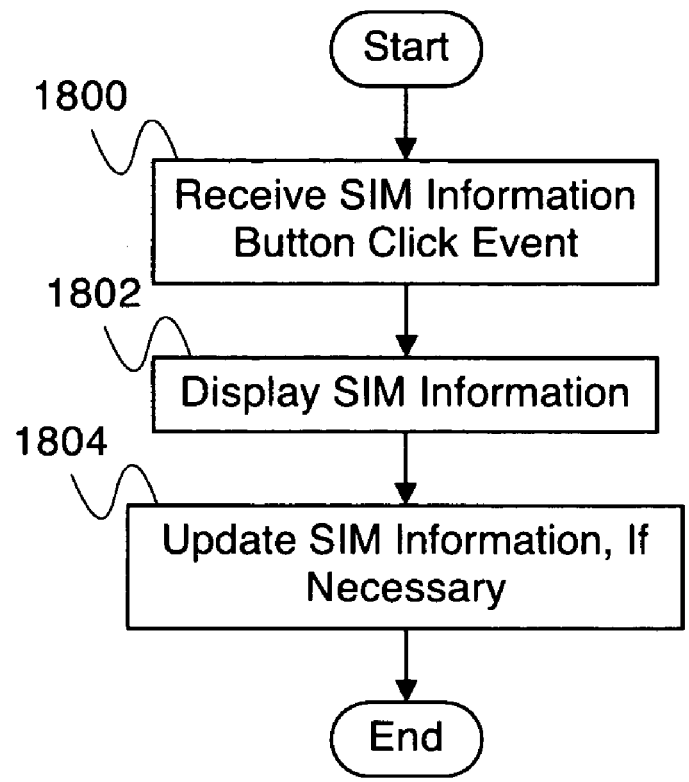
FIG. 18 is a flow diagram illustrating an embodiment of a process for a network status display to respond to a SIM information button click event.

FIG. 18 is a flow diagram illustrating an embodiment of a process for a network status display to respond to a SIM information button click event. In some embodiments, the network status display is network status display 500 of FIG. 5A. In some embodiments, the SIM information button is SIM information button 510 of FIG. 5A. In the example shown, in 1800, a SIM information button click event is received. In 1802, SIM information is displayed. In some embodiments, SIM information comprises values for a forbidden public land mobile network (FPLMN), location information for general packet radio service (LOCIGPRS), location information (LOCI), and a public land mobile network selector (PLMNsel). The network status display user may then request the SIM information to be updated. In 1804, the SIM information is updated, if necessary, and the process ends.

Figure 19:
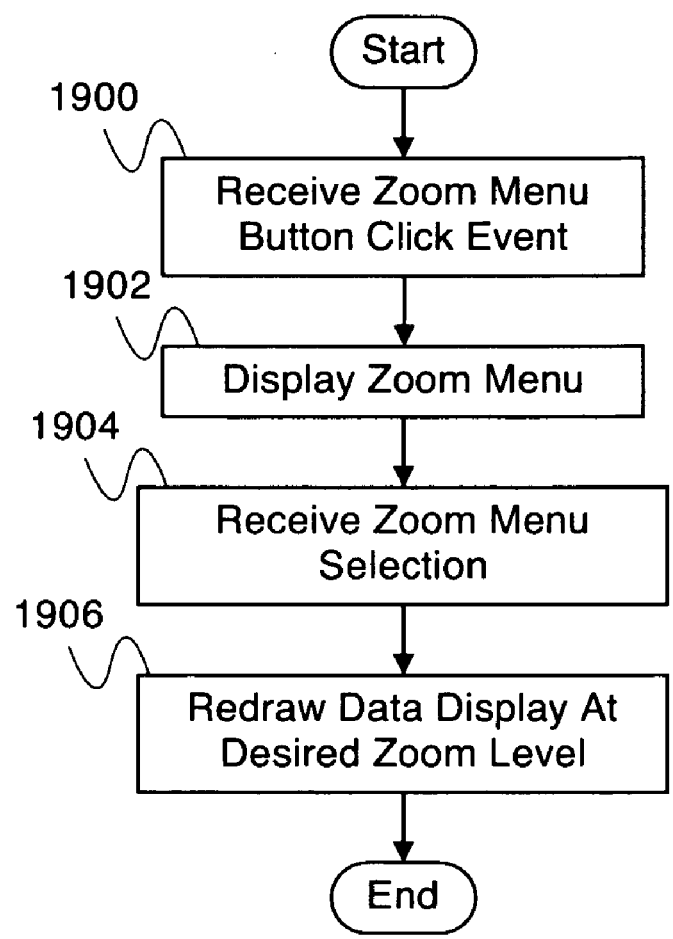
FIG. 19 is a flow diagram illustrating an embodiment of a process for a network status display to respond to a zoom menu button click event.

FIG. 19 is a flow diagram illustrating an embodiment of a process for a network status display to respond to a zoom menu button click event. In some embodiments, the network status display is network status display 500 of FIG. 5A. In some embodiments, the zoom menu button is zoom menu button 514 of FIG. 5A. In the example shown, in 1900, a zoom menu button click event is received. In 1902, the zoom menu is displayed. The zoom menu comprises one or more possible zoom levels at which the data in the network status display can be displayed. In some embodiments, the possible zoom levels comprise 30 days, 14 days, 7 days, 3 days, 1 day, 12 hours, 4 hours, 30 minutes, and 5 minutes. In 1904, a zoom menu selection is received. In 1906, the data display is redrawn at the desired zoom level, and the process ends.

Figure 20:
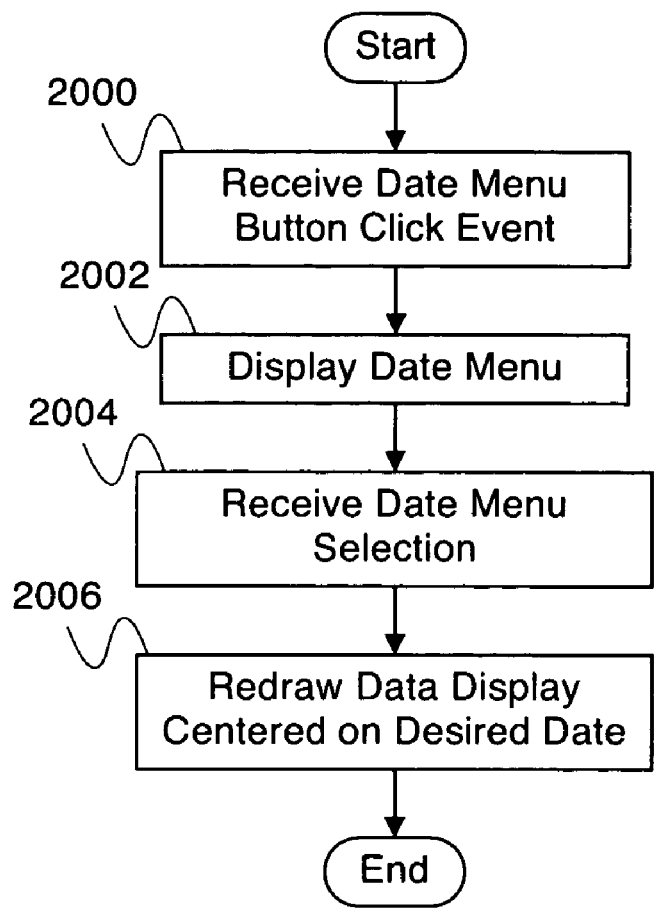
FIG. 20 is a flow diagram illustrating an embodiment of a process for a network status display to respond to a date menu button click event.

FIG. 20 is a flow diagram illustrating an embodiment of a process for a network status display to respond to a date menu button click event. In some embodiments, the network status display is network status display 500 of FIG. 5A. In some embodiments, the date menu button is date menu button 518 of FIG. 5A. In the example shown, in 2000, a date menu button click event is received. In 2002, the date menu is displayed. The date menu comprises one or more possible dates around which the data in the network status display can be centered. In 2004, a date menu selection is received. In 2006, the data display is redrawn centered on the desired date, and the process ends.

Figure 21:
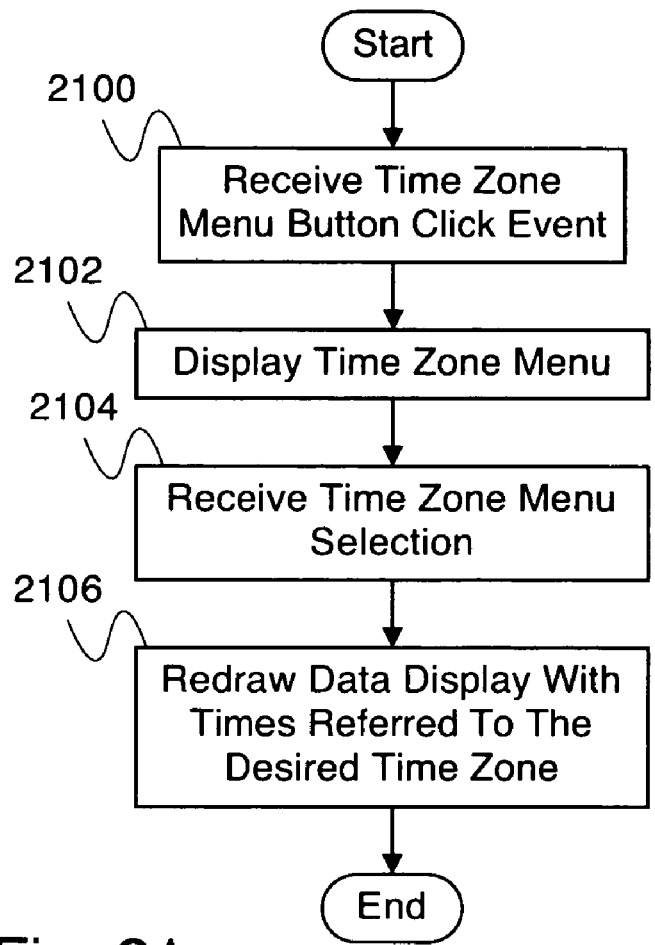
FIG. 21 is a flow diagram illustrating an embodiment of a process for a network status display to respond to a time zone menu button click event.

FIG. 21 is a flow diagram illustrating an embodiment of a process for a network status display to respond to a time zone menu button click event. In some embodiments, the network status display is network status display 500 of FIG. 5A. In some embodiments, the time zone menu button is time zone menu button 522 of FIG. 5A. In the example shown, in 2100, a time zone menu button click event is received. In 2102, the time zone menu is displayed. The zoom menu comprises one or more possible time zones to which the times in the network status display can be referred. In 2104, a time zone menu selection is received. In 2106, the data display is redrawn with times referred to the desired time zone, and the process ends.

Figure 22:
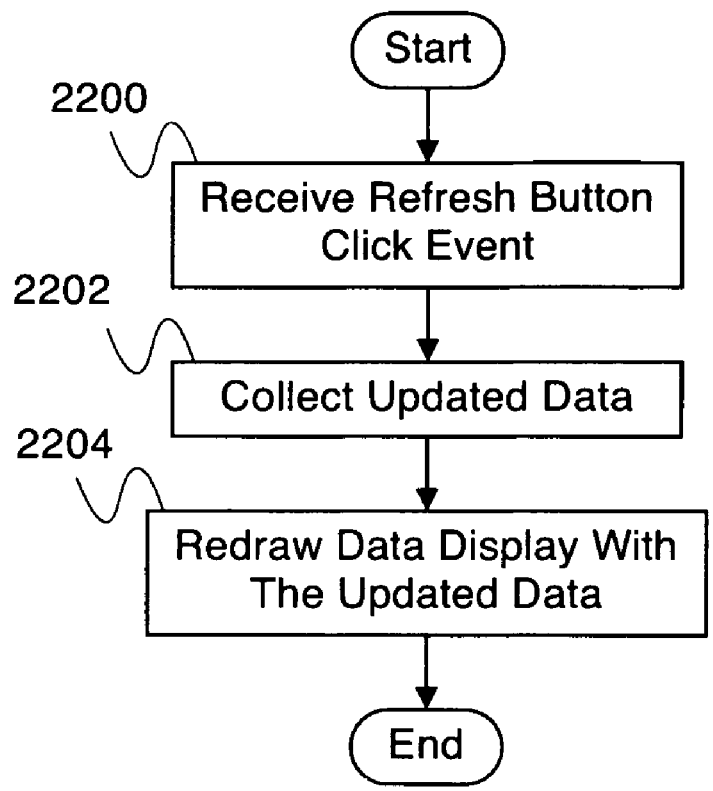
FIG. 22 is a flow diagram illustrating an embodiment of a process for a network status display to respond to a refresh button click event.

FIG. 22 is a flow diagram illustrating an embodiment of a process for a network status display to respond to a refresh button click event. In some embodiments, the network status display is network status display 500 of FIG. 5A. In some embodiments, the refresh button is refresh button 524 of FIG. 5A. In the example shown, in 2200, a refresh button click event is received. In 2202, updated data is collected. In various embodiments, updated data is collected from the cellular device associated with the network status display. (e.g., cellular device 100 of FIG. 1), from the wireless cellular network (e.g., wireless cellular network 101 of FIG. 1), or from any other appropriate device. In 2204, the data display is redrawn with the updated data, and the process ends.

Figure 23:
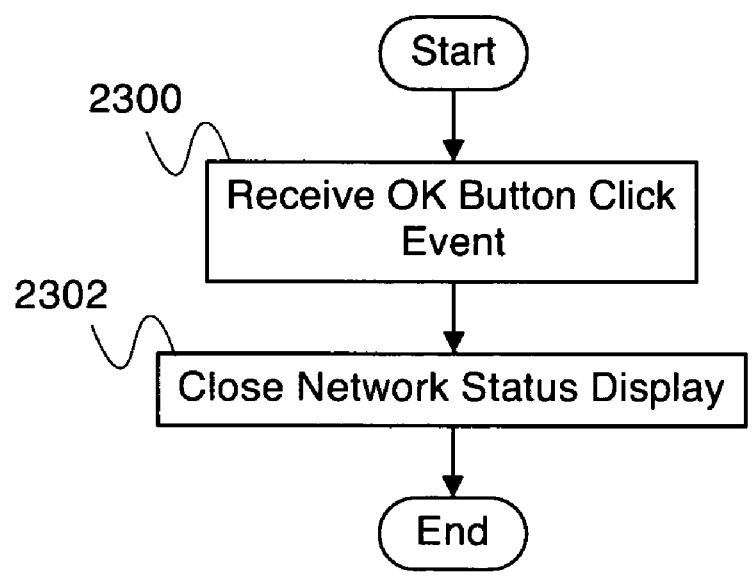
FIG. 23 is a flow diagram illustrating an embodiment of a process for a network status display to respond to an OK button click event.

FIG. 23 is a flow diagram illustrating an embodiment of a process for a network status display to respond to an OK button click event. In some embodiments, the network status display is network status display 500 of FIG. 5A. In some embodiments, the OK button is OK button 556 of FIG. 5A. In the example shown, in 2300, an OK button click event is received. In 2302, the network status display is closed, and the process ends.

Figure 24:
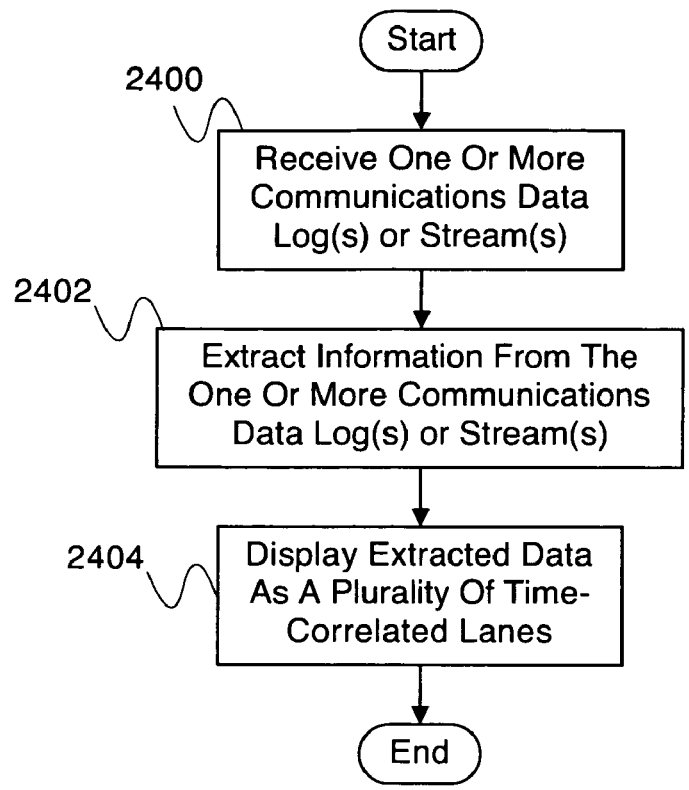
FIG. 24 is a flow diagram illustrating an embodiment of a process for a system for diagnosing wireless communication systems.

FIG. 24 is a flow diagram illustrating an embodiment of a process for a system for diagnosing wireless communication systems. In some embodiments, the process of FIG. 24 is implemented using diagnostic software 408 of FIG. 4 and executed using processor 406 of FIG. 4. In some embodiments, a mobile diagnostic device implements the process of FIG. 24 using software (e.g., 308 of FIG. 3) and executes the process using a processor (e.g., 306 of FIG. 3). In the example shown, in 2400 one or more communication data log(s) or stream(s) are received. In some embodiments, communication data log(s) or streams(s) come from a plurality of communication systems. In various embodiments, a plurality of communication systems comprises one or more of an HLR system, a radius system, an SMSC system, a SIM system, an MSC system, an SGSN system, a GSM Authorization request system, an authentication failure system, a data session system, a PDP system, or an SMS system. In various embodiments, communication data log(s) or stream(s) comprise HLR log(s) or stream(s), radius accounting log(s) or stream(s), short message service center (SMSC) log(s) or stream(s), SIM audit trail log(s) or stream(s), or any other appropriate log(s) or stream(s). In various embodiments, data extracted from HLR log(s) or stream(s) comprises MSC location history, SGSN location history, GSM Authorization request history, authentication failure history, or any other appropriate data. In various embodiments, data extracted from radius accounting log(s) or stream(s) comprises data session history (e.g., PDP contexts), or any other appropriate data. In various embodiments, data extracted from SMSC log(s) or stream(s) comprises SMS message history, or any other appropriate data. In various embodiments, data extracted from SIM audit trail log(s) or stream(s) comprises SIM status history, or any other appropriate data. In some embodiments, the processor is also for combining the one or more communications data log(s) or stream(s). In some embodiments, the processor is also for correlating the one or more communications data log(s) or stream(s).

In 2402, data (e.g. information) is extracted from the one or more communication data log(s) or stream(s). In 2404, extracted data (e.g., information) is displayed as a plurality of time-correlated lanes. For example, data is displayed using swim lanes or pop ups of a diagnostic display (e.g., a display like in FIG. 5A). In various embodiments, swim lanes have information displayed as shaded or colored bars and/or shaded or colored point events, or any other appropriate display of information. In some embodiments, data (e.g., information) is displayed as plurality of time-correlated lanes in a graphical user interface. In some embodiments, displaying information as a plurality of time-correlated lanes is managed by a role-based access control protocol. In some embodiments, access control for displaying information as a plurality of time-correlated lanes is based at least in part of an organization associated with a user.

In some embodiments, the graphical user interface is also for providing a control for changing a time zone associated with the displayed information. For example, a user selects that all times associated with lanes of displayed information are displayed in local time to a wireless cellular device, in local time for a user, in Greenwich Mean Time (GMT), or any other appropriate time. In some embodiments, the graphical user interface is also for providing a control for changing a time scale associated with the displayed information. For example, the time scale is set to show information within a few hours, one hour, a day, a half day, or any other appropriate time scale. In some embodiments, providing a control for changing a time scale includes providing a control for zooming in or zooming out, and/or a control for displaying the information at multiple time-scales (e.g., some sections with longer time scales and some sections with shorter time scales—a zoomed in section). In some embodiments, the graphical user interface is also for providing a control for displaying by a desired time or a desired date. In some embodiments, the graphical user interface is also for providing a control for displaying by scrolling or panning a time window associated with the desired information. In some embodiments, a control for displaying by scrolling or panning is provided for ease of navigation. In some embodiments, a click in a window centers a display (e.g., a click on a time centers the time in the window). In some embodiments, the graphical user interface is also for providing a control for a user to add a time-based annotation (e.g., a note of explanation). In some embodiments, the graphical user interface is also for providing a control for a user to edit a time-based annotation. In some embodiments, the graphical user interface is also for providing a control for a user to share a time-based annotation. In some embodiments, the graphical user interface is also for providing a control for selecting a format for displaying the information, wherein the format comprises one or more of the following: Event format (e.g., displays icons corresponding to events, e.g. icon 560 of FIG. 5A), Time bar format (e.g., displays time bars corresponding to events with duration, e.g. shaded area 558 of FIG. 5A), Heat map format (e.g., displays bars colored or patterned or shaded or grey-scaled to correspond to density of events, e.g. shaded area 566 of FIG. 5A), and Annotations (e.g., icons corresponding to human or machine created annotations, e.g. icon 578 of FIG. 5A). In some embodiments, the format adjusts automatically depending on the data content. In various embodiments, the format adjusts automatically by switching from one format to another format (e.g., from Event format to Heat map format or from Time bar format to Event format), by automatically scaling the time axis, by automatically scaling the density of events displayed, by automatically changing the color of the bars in the Heat map format, by automatically changing the size or shape of the icons in Event format or any other display feature, or in any other appropriate way. In some embodiments, the graphical user interface is also for providing a control for displaying additional information in response to a user click or hover. In some embodiments, a user click or hover causes an interaction with a server to obtain the additional information. In some embodiments, the graphical user interface is also for providing a control for selecting one or more time correlated lanes of the plurality of time-correlated lanes to display or hide. In some embodiments, information from one of the plurality of communication systems is displayed or associated with more than one of the plurality of time-correlated lanes. In some embodiments, a user selects which of the plurality of time-correlated lanes the information is associated with. In some embodiments, a selection of which of the plurality of time-correlated lanes the information is associated with is based at least in part on distinguishing attributes of the information displayed. In some embodiments, a user selects one or more criteria for deciding which of the plurality of time-correlated lanes each of the information elements is associated with and the associating is achieved automatically based at least in part on the one or more criteria. In various embodiments, distinguishing attributes of information displayed comprise time since information update, total information received in the displayed time period, total information received in a user defined time period, access control properties of the display user, externally defined information priority, or any other appropriate attributes. In some embodiments, the graphical user interface is also for providing a control for searching for a specific pattern in one or more of the plurality of time-correlated lanes. In some embodiments, the graphical user interface is also for providing a control for filtering out a specific pattern in one or more of the plurality of time-correlated lanes. In some embodiments, the graphical user interface is also for automatically highlighting a specific pattern in one or more of the plurality of time-correlated lanes. In some embodiments, the graphical user interface is also for automatically adding an annotation to a specific pattern in one or more of the plurality of time-correlated lanes.

In some embodiments, the graphical user interface is also for providing an active control. In some embodiments, the active control comprises sends an SMS message, wherein the sent SMS message sends a text message to a SIM. In some embodiments, the active control comprises a control that when activated sends a cancel location command, wherein the cancel location command sends a cancel location command to a SIM. In some embodiments, the active control comprises a control that when activated sends a diagnose command, wherein the diagnose control assess a SIM's ability to connect to a wireless network. In various embodiments, the active control comprises a control that when activated retrieves SIM information from one or more of the following: a SIM, a SIM database, a HLR, or any other appropriate SIM information source. In various embodiments, SIM information comprises one or more of the following: last known value or last update date or time for a SGSN, a MSC, a FPLMN, A LOCIGPRS, a LOCI, or any other appropriate SIM information. In some embodiments, an active control comprises an update (e.g., an update for a value associated with a SGSN, a MSC, a FPLMN, A LOCIGPRS, a LOCI, etc.).

In some embodiments, the display also includes active controls—for example, send SMS, send cancel location, diagnose, SIM information.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for monitoring and diagnosing wireless cellular communication systems, comprising:
   an interface configured for receiving one or more communication data streams transmitted from each of a plurality of wireless cellular communication systems at the same time, wherein the plurality of wireless cellular communication systems comprises a HLR system, a SIM system, a MSC system, a SGSN system, and a GSM Authorization request system;
   a processor for extracting information from each of the received communication data streams at the same time and in real-time; and
   a graphical user interface (GUI) for displaying the information from each of the received communication data streams as a plurality of time-correlated lanes at the same time and in real-time.

2. A system as in claim 1, wherein the processor is also utilized for combining or correlating the communication data streams.

3. A system as in claim 1, wherein the plurality of wireless cellular communication systems further comprises an authentication failure system, a data session system, a PDP system, and a SMS system.

4. A system as in claim 1, wherein information from one of the plurality of wireless cellular communication systems is associated with more than one of the plurality of time-correlated lanes.

5. A system as in claim 4, wherein a selection of which of the plurality of time-correlated lanes the information is associated with is based at least in part on distinguishing attributes of the information displayed.

6. A system as in claim 5, wherein a user selects one or more criteria for deciding which of the plurality of time-correlated lanes each of the information elements is associated with.

7. A system as in claim 1, wherein the communication data streams comprise one or more of the following: a HLR log, a radius accounting log, a SMSC log, a SIM audit trail log, MSC location history, SGSN location history, GSM Authorization request history, authentication failure history, data session history, PDP context history, SMS message history, and SIM status history.

8. A system as in claim 1, wherein the graphical user interface is also for providing a control for one or more of the following: changing a time zone associated with the displayed information, changing a time scale associated with the displayed information, and displaying by a desired time or desired date.

9. A system as in claim 1, wherein the graphical user interface is also for providing a control for one or more of the following: displaying by scrolling a time window associated with the displayed information, displaying by panning a time window associated with the displayed information, centering the display window on a single-click, and centering-and-zooming-in the display window on a double-click.

10. A system as in claim 1, wherein the graphical user interface is also for providing a control for one or more of the following: displaying additional information in response to a user click or hover, a user to add a time-based annotation, a user to edit a time-based annotation, and a user to share a time-based annotation.

11. A system as in claim 1, wherein the graphical user interface is also for providing a control for selecting a format for displaying the information, wherein the format comprises one or more of the following: Event format, Time bar format, Heat map format, and Annotations.

12. A system as in claim 1, wherein displaying the information comprises one or more of the following: adjusting a display format automatically based at least in part on the information, adjusting a display format automatically from one format to another, adjusting a display format by automatically scaling a time axis, adjusting a density of events displayed by automatically scaling, adjusting a color of a bar automatically, and adjusting a size or shape of a display feature.

13. A system as in claim 1, wherein the graphical user interface is also for providing a control for selecting one or more time-correlated lanes of the plurality of time-correlated lanes to display or hide.

14. A system as in claim 1, wherein access control for displaying information as a plurality of time-correlated lanes is one or more of the following: managed by a role-based access control system or based at least in part on an organization associated with a user.

15. A system as in claim 1, wherein the graphical user interface is also for one or more of the following: providing a control for searching for, automatically highlighting, or annotating a pattern in one or more of the plurality of time-correlated lanes.

16. A system as in claim 1, wherein the graphical user interface is also for providing a control for filtering out a pattern in one or more of the plurality of time-correlated lanes.

17. A system as in claim 1, wherein the graphical user interface is also for providing an active control.

18. A system as in claim 17, wherein the active control comprises one of more of the following: send SMS, wherein the send SMS control sends a text message to a SIM; send cancel location, wherein the cancel location control sends a cancel location to a SIM; diagnose, wherein the diagnose control assess a SIM's ability to connect to a wireless network; and SIM information, wherein the SIM information control retrieves SIM information from one or more of the following: a SIM, a SIM database, and a HLR.

19. A method for monitoring and diagnosing wireless cellular communication systems, comprising:
receiving one or more communication data streams transmitted from each of a plurality of wireless cellular communication systems at the same time, wherein the plurality of wireless cellular communication systems comprises a HLR system, a SIM system, a MSC system, a SGSN system, and a GSM Authorization request system;
extracting information using a processor from the received communication data streams at the same time and in real-time; and
displaying the information as a plurality of time-correlated lanes at the same time and in real-time.

20. A non-transitory computer program product for monitoring and diagnosing wireless cellular communication systems, the non-transitory computer program product being embodied in a non-transitory computer readable storage medium and comprising computer instructions for:
receiving one or more communication data streams transmitted from each of a plurality of wireless cellular communication systems at the same time, wherein the plurality of wireless cellular communication systems comprises a HLR system, a SIM system, a MSC system, a SGSN system, and a GSM Authorization request system;
extracting information using a processor from the received communication data streams at the same time and in real-time; and
displaying the information as a plurality of time-correlated lanes at the same time and in real-time.

21. A system for monitoring and diagnosing wireless cellular communication systems, comprising:
an interface configured for receiving one or more communication data streams transmitted from each of a plurality of wireless cellular communication systems at the same time, wherein the plurality of wireless cellular communication systems comprises a HLR system, a SIM system, a MSC system, a SGSN system, and a GSM Authorization request system,
a processor for extracting information from each of said received communication data streams at the same time and in real-time, and
a graphical user interface for displaying the information in a table at the same time and in real-time.

22. A method for monitoring and diagnosing wireless cellular communication systems, comprising:
receiving one or more communication data streams transmitted from each of a plurality of wireless cellular communication systems at the same time, wherein the plurality of wireless cellular communication systems comprises a HLR system, a SIM system, a MSC system, a SGSN system, and a GSM Authorization request system;
extracting information using a processor from each of the received communication data streams at the same time and in real-time; and
displaying the information in a table at the same time and in real-time.

23. A non-transitory computer program product for monitoring and diagnosing wireless cellular communication systems, the non-transitory computer program product being embodied in a non-transitory computer readable storage medium and comprising computer instructions for:

receiving one or more communication data streams transmitted from each of a plurality of wireless cellular communication systems at the same time, wherein the plurality of wireless cellular communication systems comprises a HLR system, a SIM system, a MSC system, a SGSN system, and a GSM Authorization request system;

extracting information using a processor from each of the received communication data streams at the same time and in real-time; and displaying the information in a table at the same time and in real-time.

* * * * *